United States Patent [19]

Okabe

[11] Patent Number: 5,477,525
[45] Date of Patent: Dec. 19, 1995

[54] DATA DESTRUCTION PREVENTING METHOD, RECORDING APPARATUS PROVIDED WITH DATA DESTRUCTION PREVENTING CAPABILITY, AND DISC RECORDED WITH GUARD BAND

[75] Inventor: Masanobu Okabe, Kanagawa, Japan

[73] Assignee: Sony Corporation, Tokyo, Japan

[21] Appl. No.: 114,751

[22] Filed: Aug. 31, 1993

[30] Foreign Application Priority Data

| Sep. 3, 1992 | [JP] | Japan | 4-258872 |
| Sep. 3, 1992 | [JP] | Japan | 4-258873 |
| Sep. 7, 1992 | [JP] | Japan | 4-262714 |
| Sep. 7, 1992 | [JP] | Japan | 4-262715 |

[51] Int. Cl.$^6$ ............... G11B 15/087; G11B 27/026
[52] U.S. Cl. ............... 369/275.3; 369/30; 369/56; 369/58
[58] Field of Search ............... 369/275.3, 58, 369/54, 56, 57, 59, 30; 395/275

[56] References Cited

U.S. PATENT DOCUMENTS

| 4,075,665 | 2/1978 | Borne et al. ............... 360/8 |
| 4,413,289 | 11/1983 | Weaver et al. ............... 360/51 |
| 4,754,483 | 6/1988 | Weaver ............... 381/36 |
| 4,789,975 | 12/1988 | Taniyama ............... 369/59 |
| 4,791,623 | 12/1988 | Deiotte ............... 369/59 |
| 4,862,439 | 8/1989 | Ando et al. ............... 369/58 |
| 4,882,754 | 11/1989 | Weaver et al. ............... 381/35 |
| 5,119,291 | 6/1992 | Flannagan et al. ............... 395/275 |
| 5,170,385 | 12/1992 | Senshu et al. ............... 369/275.3 |
| 5,202,876 | 4/1993 | Takagi et al. ............... 369/58 |
| 5,214,631 | 5/1993 | Maeda et al. ............... 369/59 |
| 5,224,087 | 6/1993 | Maeda et al. ............... 369/54 |
| 5,243,588 | 9/1993 | Maeda et al. ............... 369/54 |
| 5,272,691 | 12/1993 | Watanabe ............... 369/124 |
| 5,317,553 | 5/1994 | Ohga et al. ............... 369/124 |
| 5,319,627 | 6/1994 | Shinno et al. ............... 369/54 |

FOREIGN PATENT DOCUMENTS

| 0426872A1 | 5/1991 | European Pat. Off. ............... G11B 20/12 |
| 0463A83A1 | 1/1992 | European Pat. Off. ............... G11B 20/12 |
| WO80/01328 | 6/1980 | WIPO ............... G11C 13/04 |
| WO91/11002 | 7/1991 | WIPO ............... G11B 20/12 |
| WO91/14265 | 9/1991 | WIPO ............... G11B 20/10 |

*Primary Examiner*—Georgia Y. Epps
*Assistant Examiner*—Kim-Kwok Chu
*Attorney, Agent, or Firm*—Limbach & Limbach

[57] ABSTRACT

A disc having recordable and recorded areas discretely scattered over it at the same time is formed with a guard band to prevent the recorded area from being destroyed by a track jump caused by an undue impact or vibration applied to the disc during a recording operation. Additionally, storing in memory information of an edge of a recorded area by a predetermined amount before recording, the edge providing a boundary between the recorded area and a recordable area, allows recovery of data in the recorded area destroyed by a track jump caused by an undue impact or vibration applied to a disc.

21 Claims, 23 Drawing Sheets

FIG. I
(PRIOR ART)
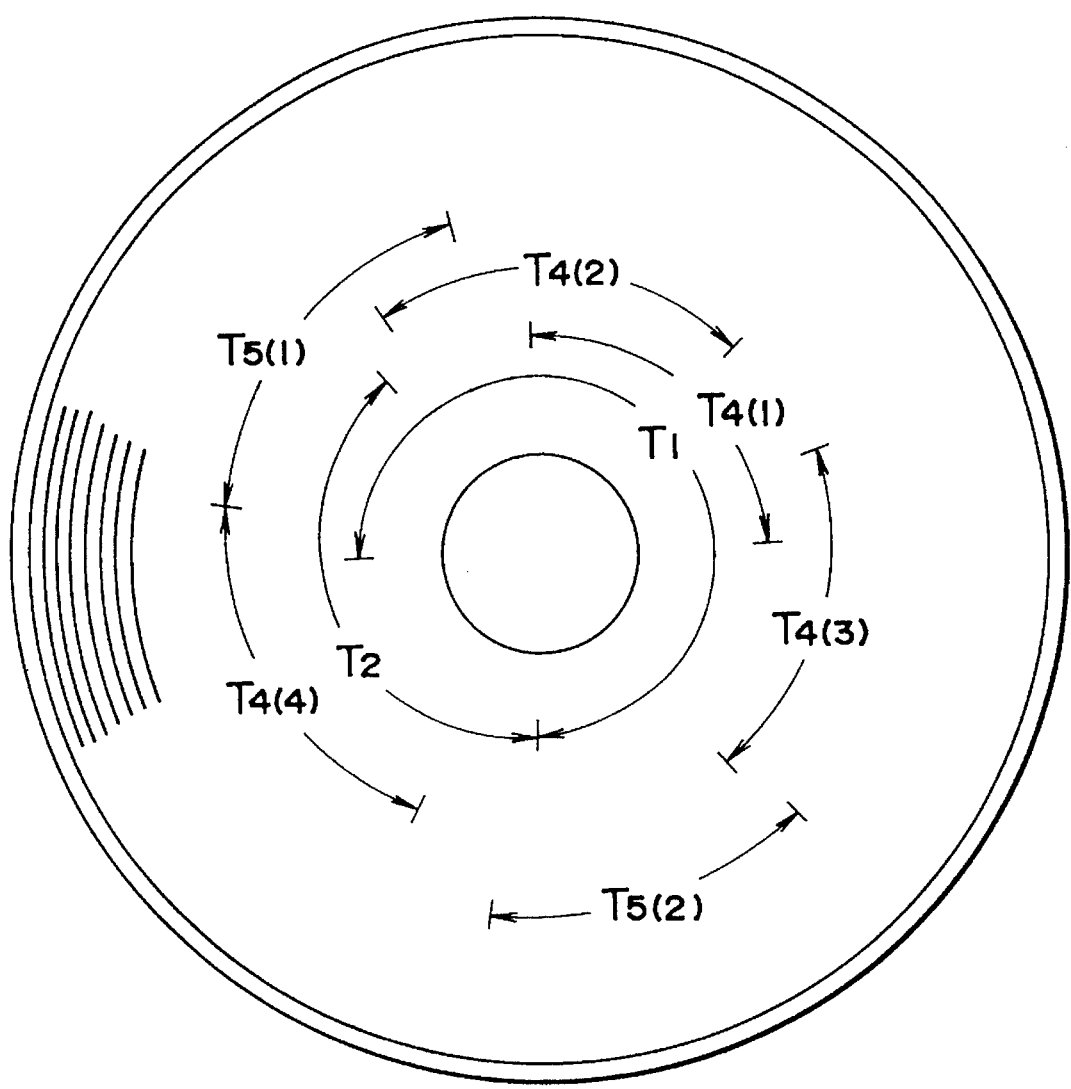

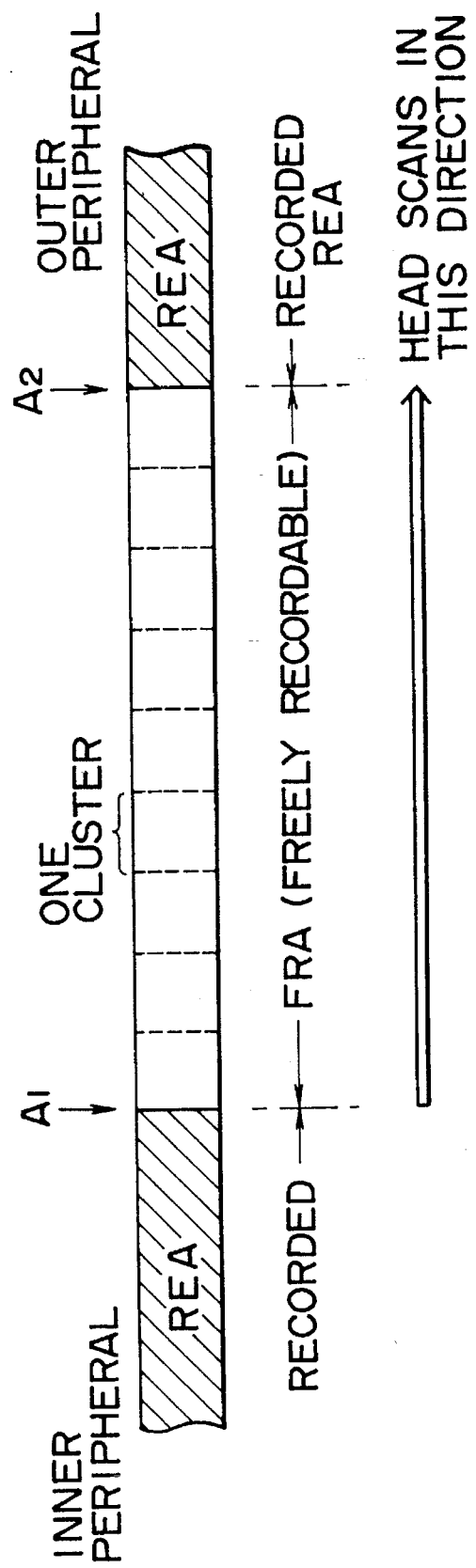

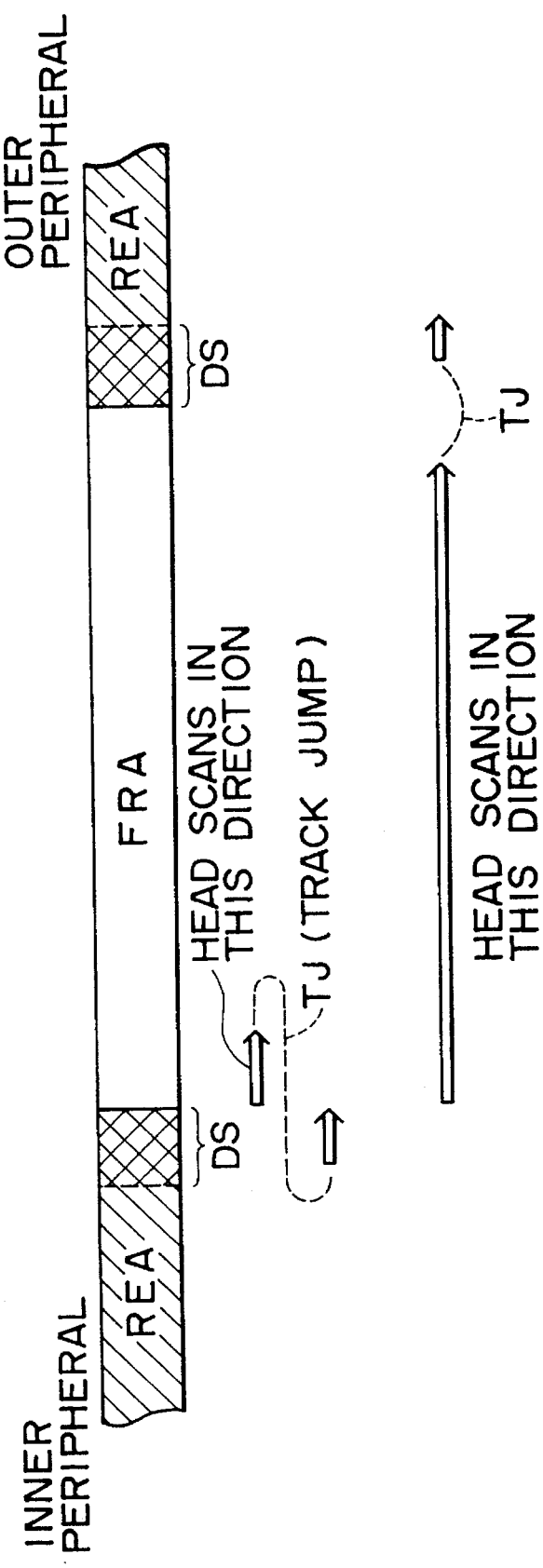

FIG. 4

| | 16 BIT | | 16 BIT | | |
|---|---|---|---|---|---|
| | MSB      LSB | MSB      LSB | MSB      LSB | MSB      LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster | Cluster' | 00000000 | 00000000 | 3 |
| | 00000000 | 00000000 | 00000000 | 00000000 | 4 |
| | 00000000 | 00000000 | 00000000 | 00000000 | 5 |
| | | | | | 6 |
| | | | First TNO | Last TNO | 7 |
| | | | | Used Sectors | 8 |
| | | | | | 9 |
| | | | | | 10 |
| | Disc | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | | | | | 76 |
| | | | | | 77 |
| CONTROL TABLE (255 PARTS TABLES) | (01) START ADDRESS | | | TRACK MODE | 78 |
| | END ADDRESS | | | LINK INFORMATION | 79 |
| | (02) START ADDRESS | | | TRACK MODE | 80 |
| | END ADDRESS | | | LINK INFORMATION | 81 |
| | (03) START ADDRESS | | | TRACK MODE | 82 |
| | END ADDRESS | | | LINK INFORMATION | 83 |
| | (FC) START ADDRESS | | | TRACK MODE | 500 |
| | END ADDRESS | | | LINK INFORMATION | 581 |
| | (FD) START ADDRESS | | | TRACK MODE | 582 |
| | END ADDRESS | | | LINK INFORMATION | 583 |
| | (FE) START ADDRESS | | | TRACK MODE | 584 |
| | END ADDRESS | | | LINK INFORMATION | 585 |
| | (FF) START ADDRESS | | | TRACK MODE | 586 |
| | END ADDRESS | | | LINK INFORMATION | 587 |

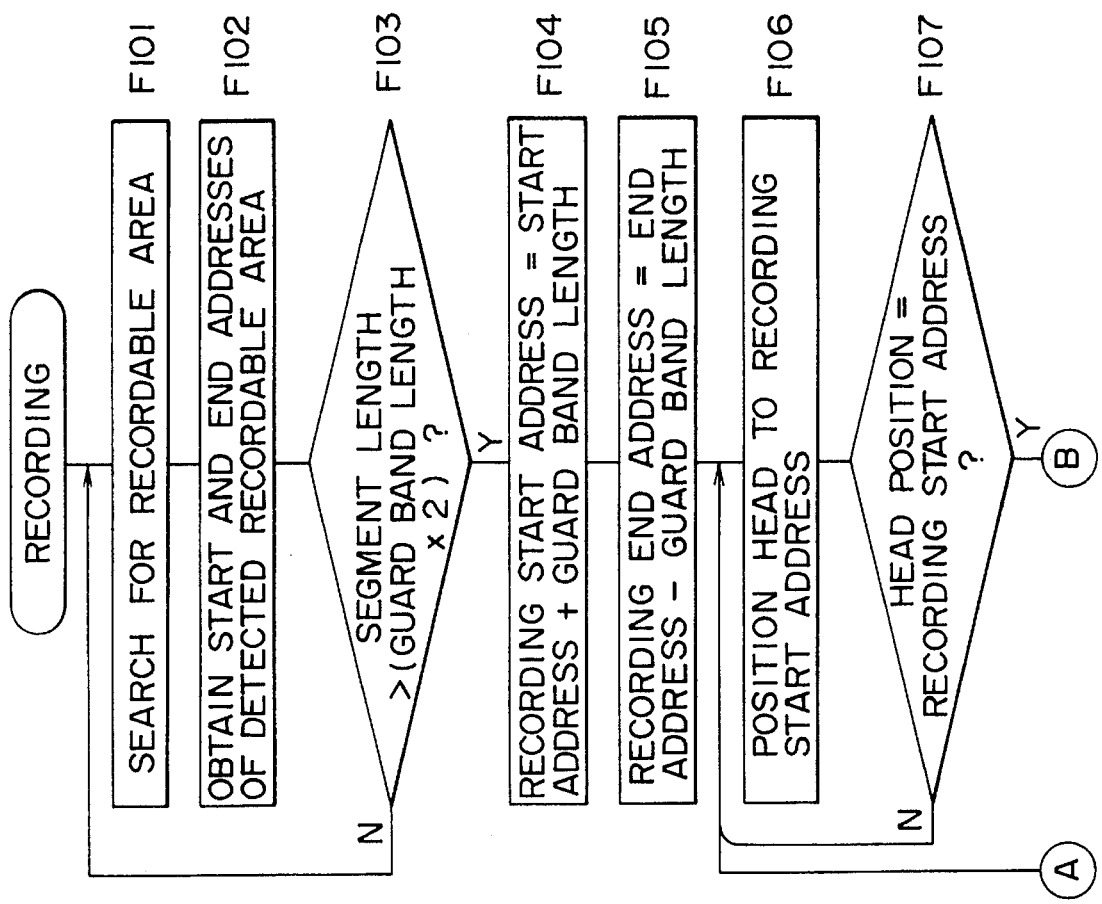

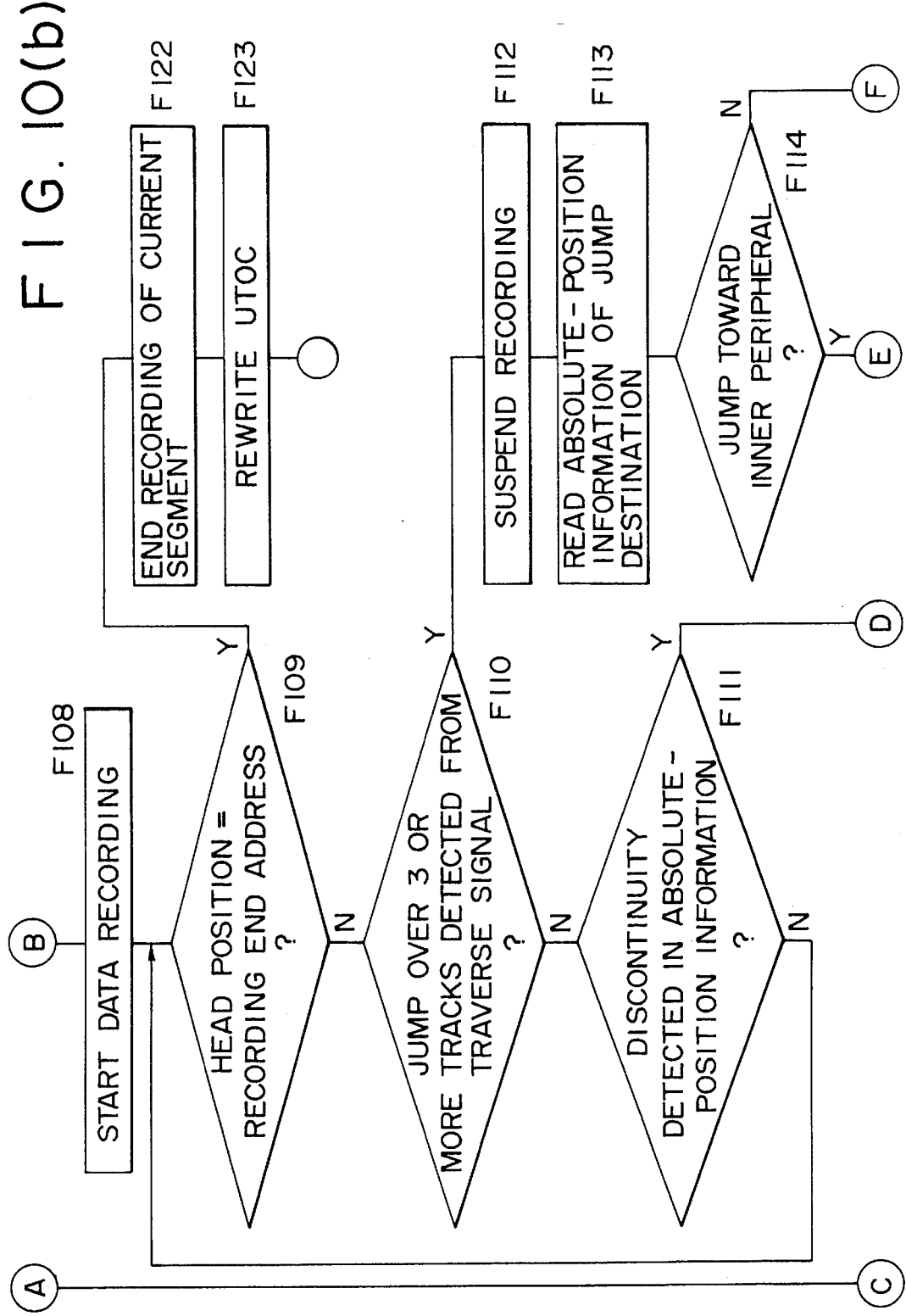

FIG. 10(c)

```
    (D)
     │
     ▼
  ┌──────────────────┐ F115
  │ SUSPEND RECORDING│
  └──────────────────┘
     │
     ▼
  ┌─────────────────────────────┐ F117
  │ OBTAIN CLUSTER FROM WHICH TO│
  │ START RE-RECORDING          │
  └─────────────────────────────┘
     │
     ▼
    ╱╲  F119
   ╱  ╲
  ╱DATA╲
 ╱BETWEEN╲ N    ┌──────────────┐ F120
╱OBTAINED ╲────▶│RECORDING     │
╲CLUSTER  ╱     │ERROR         │
 ╲AND    ╱      └──────────────┘
  ╲ADDR ╱
   ╲BEFORE╱
    ╲JUMP╱
     ╲? ╱
      Y
      │
      ▼
  ┌──────────────────┐ F121
  │USE START ADDRESS │
  │OF OBTAINED       │
  │CLUSTER AS        │
  │RECORDING START   │
  │ADDRESS           │
  └──────────────────┘
      │
     (C)
```

(E) → OBTAIN CLUSTER CONTAINING ADDRESS ONE CLUSTER BEFORE ABSOLUTE-POSITION INFORMATION OF JUMP DESTINATION — F118

(F) → OBTAIN CLUSTER CONTAINING ADDRESS OF ABSOLUTE-POSITION INFORMATION DETECTED LAST BEFORE JUMP — F116

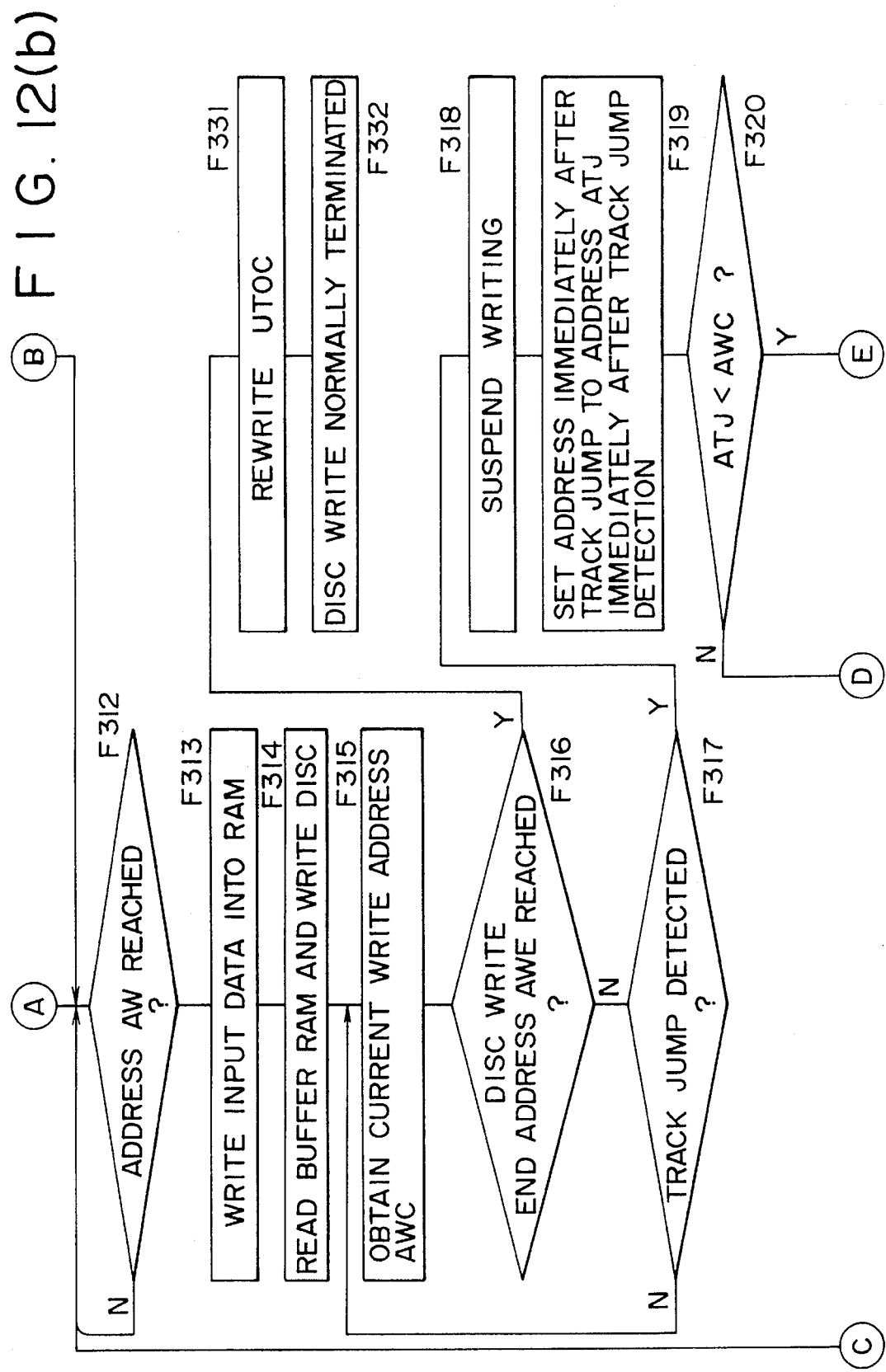

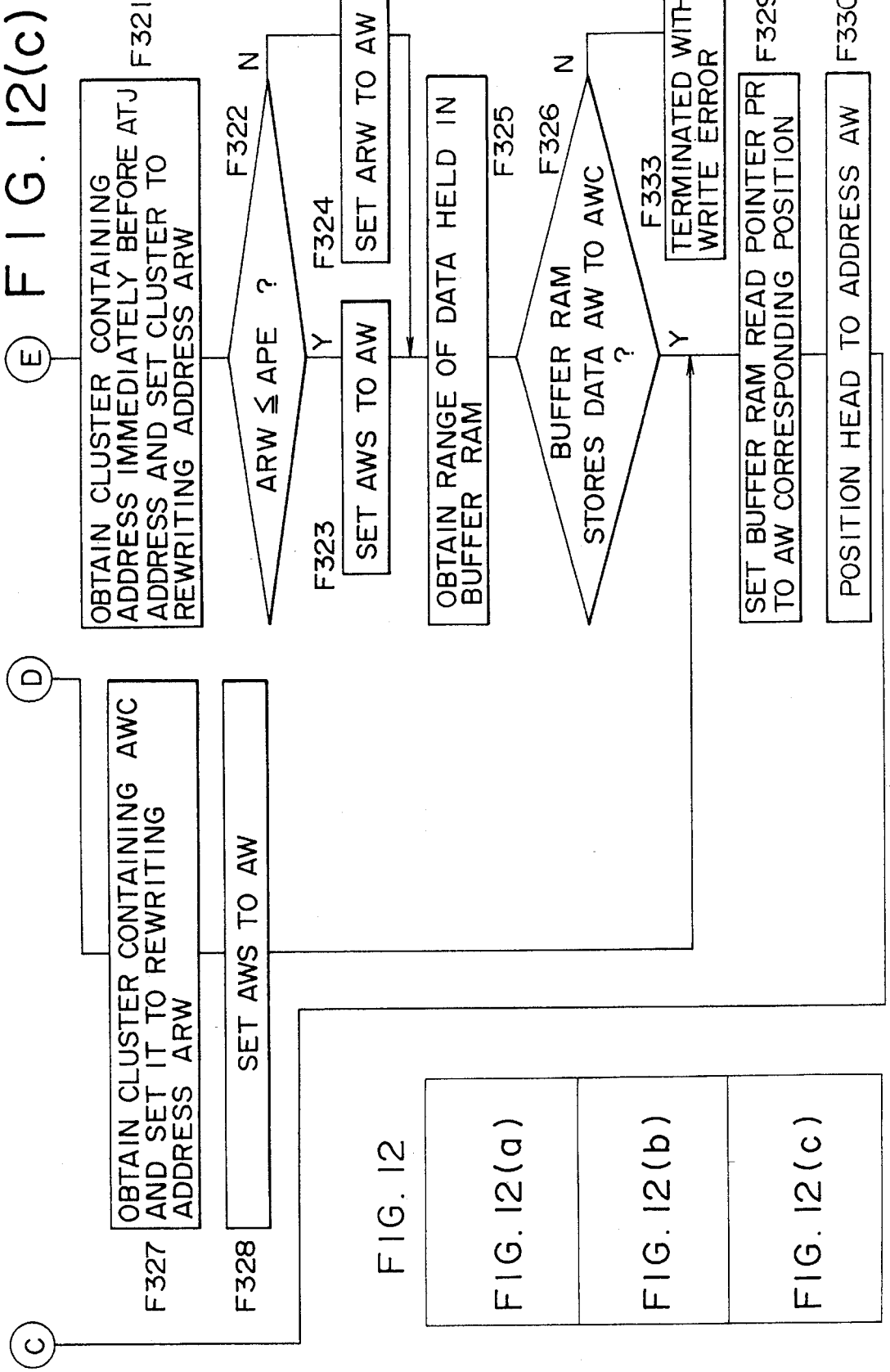

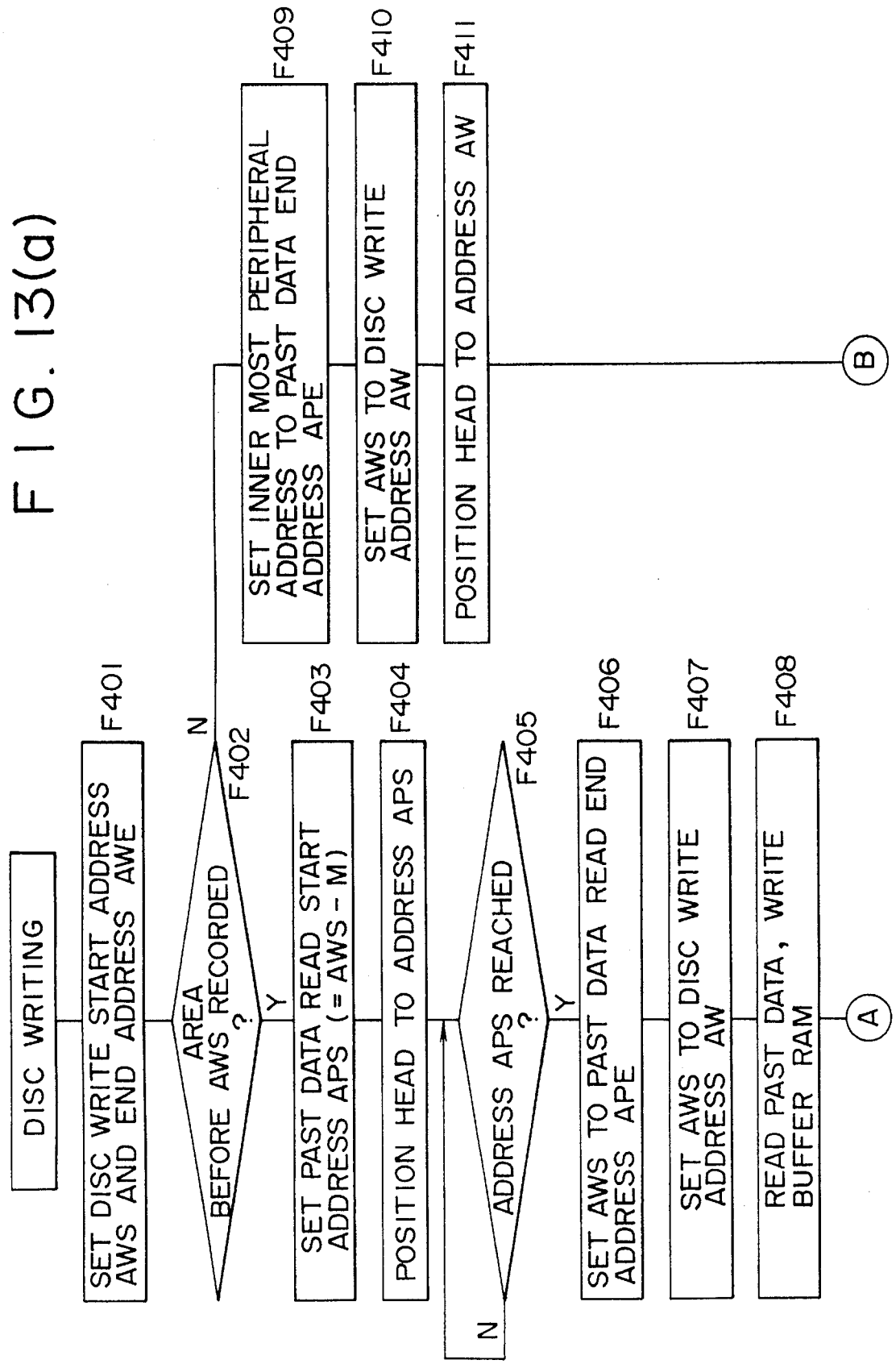

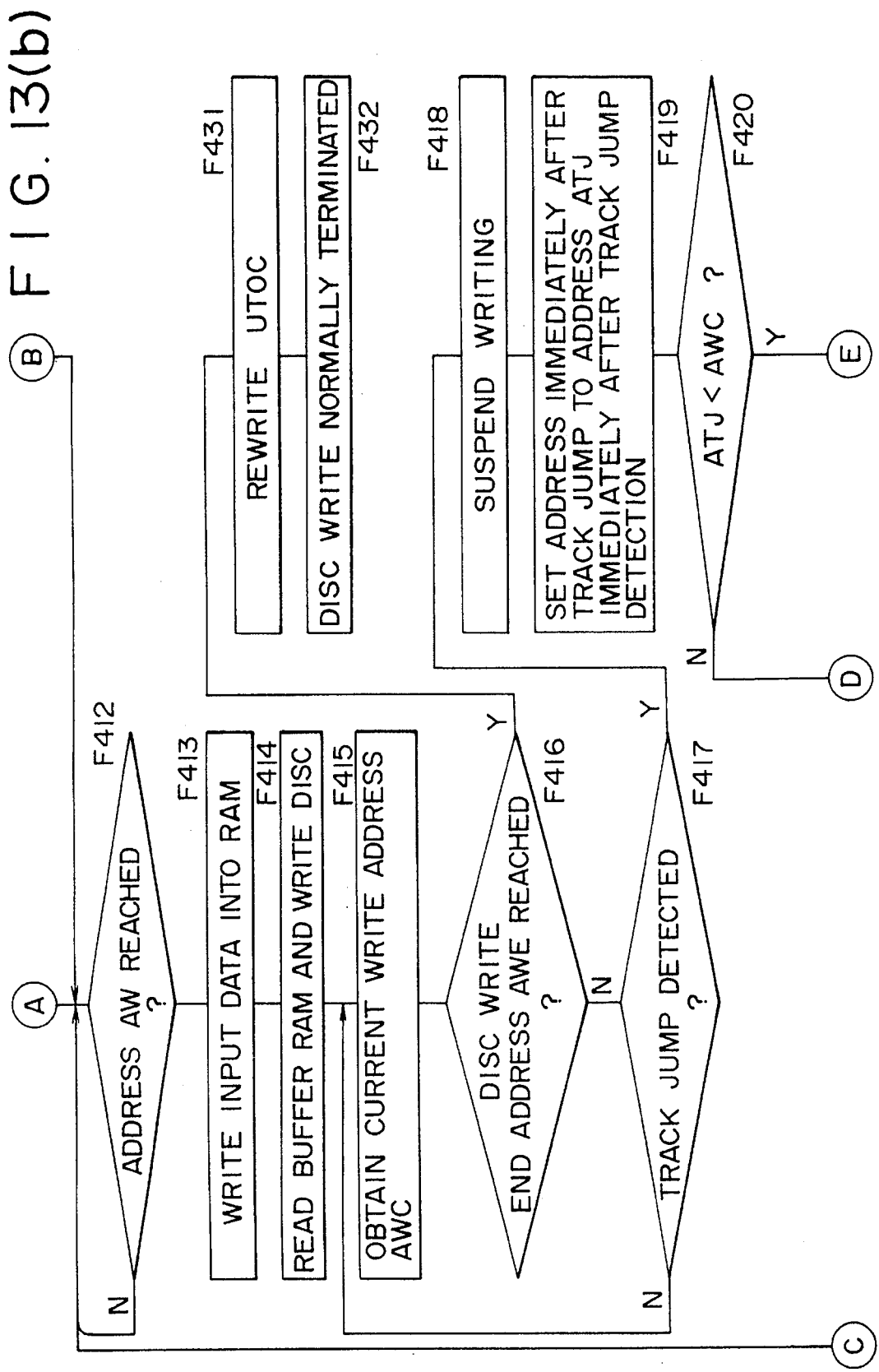

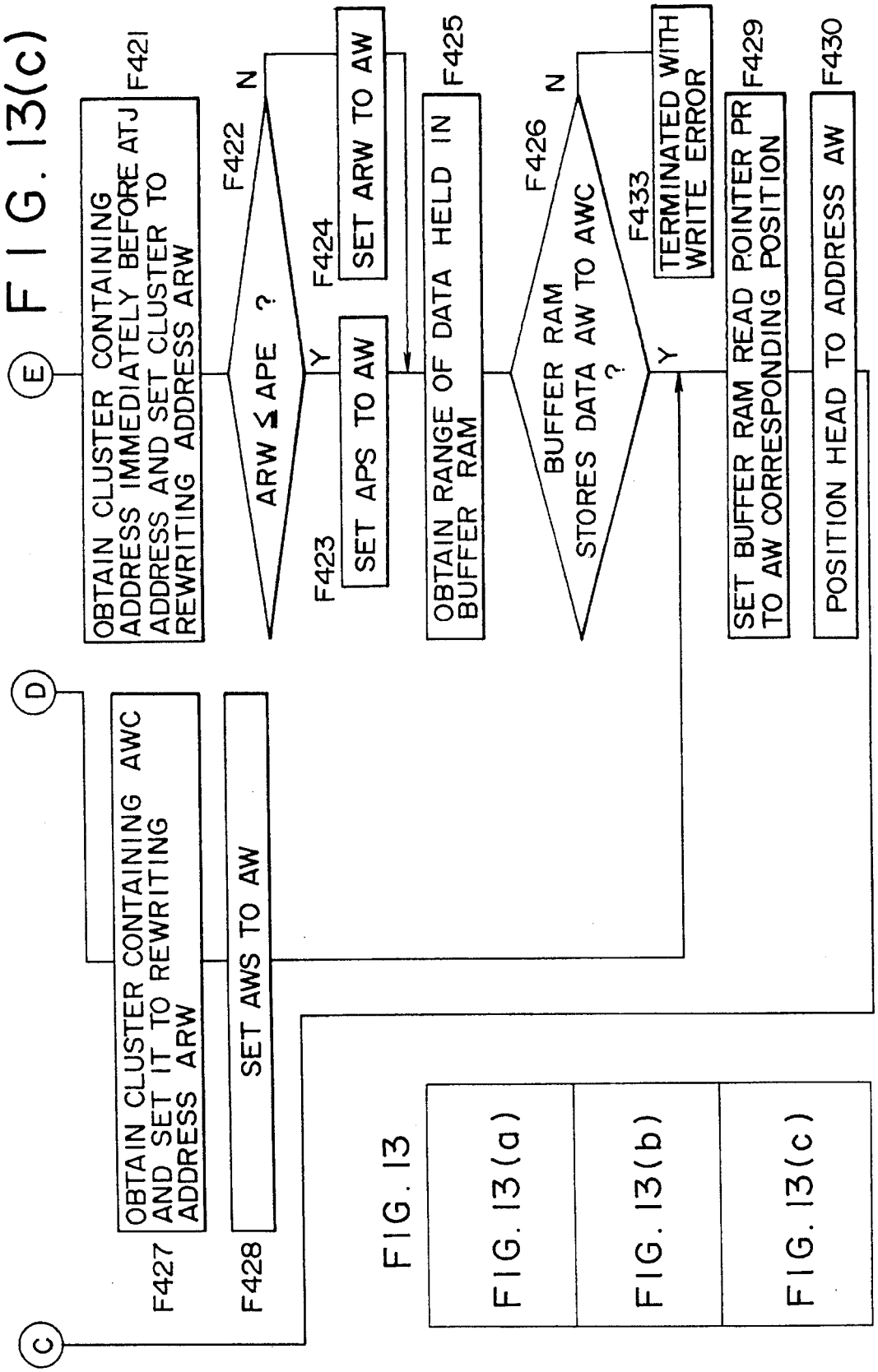

DATA DESTRUCTION PREVENTING METHOD, RECORDING APPARATUS PROVIDED WITH DATA DESTRUCTION PREVENTING CAPABILITY, AND DISC RECORDED WITH GUARD BAND

BACKGROUND OF THE INVENTION

1. Field of the Invention

The present invention relates to a recording apparatus capable of recording data such as music data onto disc recording medium for example.

2. Description of the Related Art

It is known from U.S. Ser. No. 945488 filed in Sep. 10, 1992 for example that a data-rewritable disc recording medium capable of recording data such as music data by a user is provided with a so-called user table of contents (UTOC) for managing the data such as music data in a recorded area and a recordable area. When recording a program, a recording apparatus searches the UTOC for a recordable area on the disc to record audio data to the area.

It is also known that a disc recording medium such as a magneto-optical disc is far easier than a tape recording medium such as a digital audio tape (DAT) or a compact cassette tape in a random access operation.

Accordingly, one program need not be recorded always in a continuous segment. A segment herein denotes a part of one or more recording tracks in which physically continuous data is recorded. The data may be recorded in a single segment or a plurality of discrete segments. Therefore, even if tracks for recording a program are physically divided into a plurality of discrete segments, repeating a recording/reproducing operation on each segment with an associated high-speed access operation allows the program to be recorded or reproduced as an integral entity.

For example, a recording arrangement as shown in FIG. 1 is possible where a first piece of music and a second piece of music are recorded in segment T1 and segment T2 respectively that are contiguous with each other, and a fourth piece and a fifth piece are dividedly recorded in segments T4(1) through T4(4) and segments T5(1) through T5(2) respectively that are distributed over tracks. It should be noted that FIG. 1 is a schematic diagram of a recording arrangement on a disc recording medium; actually, however, a single segment often consists of a plurality of tracks formed spirally or concentrically.

Meanwhile, when recording and erasing of programs are repeated on a magneto-optical disc, the disc comes to contain both recorded segments and erased segments at the same time. When overwriting a recorded program with another shorter than it in music playing time for example, a resultant differential area becomes meaningless as integral data. So, an area recorded with such a fragmentary data is registered in the above-mentioned UTOC as a recordable area. This prevents data recording areas otherwise wasted from being formed as a result of repeating recording and erasing operations. Here, it should be noted that data to be recorded includes not only music signals but also any other digital signals, and a block of the data continuous in its content and meaningful as an entity is hereinafter referred to as a program.

It is apparent that, with the above-mentioned disc medium, recording of a program is continued by accessing a plurality of segments which provide recordable areas for parts of the program respectively and, at reproduction, the segments are accessed so that the parts are read to be put together into the original continuous program. Information necessary for linking the segments and indicating the recordable areas is stored as UTOC information which is rewritten at each rewriting or erasing operation as mentioned above. A recording/reproducing apparatus is controlled so that it reads this UTOC information to perform a head access operation for a proper recording/reproducing operation.

Meanwhile, an undue vibration or impact applied to the recording/reproducing apparatus may cause a track jump. For example, as shown in FIG. 2(a), if there are recorded areas REAs adjacent to both sides of a freely recordable area FRA, a recording head (an optical head or a magnetic head) normally scans from address A1 to address A2; however, a track jump may throw the recording head out of the FRA into the adjacent REA as indicated by a dashed line represented by TJ of FIG. 2(b). The track jump may destroy recorded data for example, a portion indicated by DS in the figure, making the data irrecoverable. Therefore, if the track jump occurs, a recording operation under way must be immediately suspended (that is, laser power output or magnetic-field application must be turned off).

A detection of a track jump is disclosed in U.S. Pat. No. 5,012,461 for example in which absolute-position information recorded on a disc as a pregroup (a wobbling group) is monitored for its continuity and a track jump is determined upon detecting a discontinuity to suspend a recording operation under way. However, the above-mentioned disclosure has a drawback in that, during a delay until information on a reflected light coming from a pregroup is decoded as the absolute-position information, a jump may have taken place over several tracks for example, making impossible the prevention of data destruction. That is, braking a scanning operation based on the absolute-position information is often too late to protect data against destruction.

In another approach, a traverse signal generated when a laser spot traverses a track is monitored to detect a track jump. This method is quick the detection. Actually, however, the traverse signal may also be generated by a foreign matter on the disc for example, indicating a false track jump. If a recording operation is suspended by the traverse signal generated by the foreign matter on the disc, recording efficiency decreases, thereby lowering practicality of an apparatus based on such a detection method. This problem is conspicuous especially when dubbing a piece of music from a source equipment unit.

OBJECTS AND SUMMARY OF THE INVENTION

Accordingly, it is a general object of the present invention to provide a recording apparatus which prevents recorded data from being destroyed by a track jump in a recording operation and enhances recording efficiency.

It is a more specific object of the present invention to provide a recording apparatus which, if recorded data has been destroyed by a track jump, ensures a re-recording operation for data recovery.

In carrying out the invention and according to one aspect thereof, there is provided as a first preferred embodiment a recording apparatus wherein, if an area adjacent to data recordable area on a recording medium has already been written with data, a guard band of a predetermine length in which no data will be written is formed in the recordable area at and end thereof adjacent to the recorded area. To be specific, if a continuous recordable area is located between recorded areas, the guard band is formed at a front end or a rear end of the recordable area or at both ends respectively. If a recorded area is located before recordable area, the guard band is formed only at the front end of the recordable area. It a recorded area is located after a recordable area, the guard band is formed only at the rear end of the recordable area.

The recording apparatus which performs a recording operation with the guard band formed as mentioned above comprises data reading means for reading data from a recording medium recorded with at least both a control table consisting of a plurality of parts tables each containing, with respect to each data and recordable area recorded as segment control data for reproducing or recording data in one continuous segment or a plurality of discrete segments, an start address and an end address of each associated segment and link information about a parts table containing a start address and an end address of another segment linked to the current segment via the end address thereof and corresponding table pointing data for indicating a recorded position of the start parts table of one or more parts tables in the control table respectively corresponding to one or more recordable areas; storage means for storing segment control data read by the data reading means; and arithmetic means for performing a predetermined arithmetic operation on the segment control data stored in the storage means.

The arithmetic means comprises recordable segment length calculating means for calculating a length of a recordable segment from its start and end addresses recorded in a parts table determined by corresponding table pointing data in the segment control data to be corresponding to a recordable area; comparing means for comparing the calculated recordable segment length with a value which is two times as high as a guard band length set to a predetermined value; recording start address calculating means for calculating, if the recordable segment length is found longer than double the guard band length, an address obtained by shifting in a recording direction a start address indicating a start of an associated recordable segment by the predetermined guard band length as a recording start address; and recording end address calculating means for calculating, if the recordable segment length is found longer than double the guard band length, an address obtained by shifting in a direction opposite to the recording direction an end address indicating an end position of the associated recordable segment as a recording end address.

When recording a recordable segment, if an area adjacently located before a recordable area is found already recorded with data, recording is made starting at a location indicated by the recording start address; if an area adjacently located after the recordable area is found already recorded with data, recording is stopped at a location indicated by the recording end address.

In the above-mentioned setup, if a recordable segment length of a recordable area obtained from the segment control data is shorter than double the guard band length, link information recorded in a parts table corresponding to the recordable area is used to search for a parts table corresponding to another parts table to extract a recordable area whose recordable segment length is longer than double the guard band length. The recording start address calculating means calculates, as a recording start address, an address obtained by shifting a start address recorded in a parts table corresponding to the extracted recordable segment by the guard band length in the recording direction. The recording end address calculating means calculates, as a recording end address, an address obtained by shifting an end address recorded in the parts table corresponding to the extracted recordable segment by the guard band length in the direction opposite to the recording direction.

It is another more specific object of the present invention to provide as a second preferred embodiment a recording apparatus which, if a recording error or a data destruction has been caused by a track jump in an area being written, performs an appropriate re-recording operation for data recovery.

The above-mentioned recording apparatus comprises recording/reproducing means for recording/reproducing data on a recording medium, buffer memory means for holding recording data entered in a data recording operation for a predetermined duration, and control means for controlling a recording/reproducing position by the recording/reproducing means and a read/write operation of the buffer memory means. If an area adjacently located before a continuous recordable area to which data is to be written is a recorded area already written with data, this control means first makes the recording/reproducing means read data starting from a predetermined location in the recorded area to store the data thus read in the buffer memory means. When the recording/reproducing means has read data up to the recordable area, the control means controls execution of an operation for recording, by means of the recording/reproducing means, the data entered and stored in the buffer memory means.

If a track jump has been detected during recording the data to the recordable area, the control means suspends the recording operation. And, if data in the recorded area adjacent to the recordable area has been destroyed by the track jump, the control means reads the previously stored data of the recorded area from the buffer memory means to control execution of a recording operation for recovering the destroyed data. It should be noted that the recovery data is recorded not to the area in which the data destruction has occurred; rather the recovery data is written in the recordable area being currently written, starting at its beginning. The recovery data is followed by the current recording data. In this case, the area suffered from the data destruction is needed no more, so that the control means makes it another recordable area.

It is still another specific object of the present invention to provide a recording apparatus which will not performed the above-mentioned re-recording control upon detection of a small-scale track jump caused by a foreign matter such as a dust on the recording medium, thereby enhancing recording efficiency.

The above-mentioned recording apparatus comprises jump track count detecting means for detecting the number of tracks on a recording medium jumped by a recording head, counting means for counting the number of tracks jumped, comparing means for comparing, at data recording, a count value obtained by the counting means with a predetermined number of tracks providing a reference value, buffer memory means for storing recording data for a predetermined duration after data recording, track jump detecting means for determining an occurrence of a track jump if the count value has been found greater than the reference value by the comparing means, and control means for suspending the data recording operation upon detection of the track jump to perform a re-recording operation by using the recording data stored in the buffer memory means.

In addition to suspending the data recording operation upon detection of the track jump, the control means determines a direction in which the track jump has taken place by reading address information obtained after the track jump. If the direction has been found toward an inner peripheral of the recording medium, the control means starts a re-recording operation from a recording unit (a cluster) containing address information immediately before the address information obtained after the track jump; if the direction has been found toward an outer peripheral of the recording medium, the control means starts the re-recording operation from a recording unit (a cluster) containing address information immediately before the track jump.

The above-mentioned setup provides following advantages.

The guard band provided prevents the recording head from jumping from a recordable area to a recorded area if a small track jump over one or two tracks for example, depending on a guard band length, has taken place which cannot be determined by detection of a traverse signal whether having been caused by a foreign matter such as a dust on the recording medium or by an undue impact or vibration applied to the recording apparatus, protecting recorded data against destruction. If the traverse signal has been caused by the dust, the recording operation may be continued without interruption. It is therefore unnecessary to suspend the recording operation every time such a small track jump has taken place. It will be apparent that, even if an actual track jump, a track jump caused other than the dust, has taken place, data to be destroyed is one immediately following the data written by a current recording operation and therefore can be recovered by rewriting in most cases.

A large track jump (over three or more tracks for example) which may cause the optical head to jump into a recorded area can be detected by means of a traverse signal almost correctly and promptly. Therefore, if such a large track jump has taken place, indicated by the traverse signal, a recording operation may be suspended before irrecoverable past data in the recorded area is destroyed. That is, a track jump detecting operation for determining whether to execute rewriting for data recovery or not provides a most accurate detecting operation when the traverse signal count value is compared with the reference value and a track jump is determined only when the number of tracks found exceeding the reference value have been jumped.

For example, when data is written to a continuous recordable area and the write-protected guard band is provided in such an area at a front end or a rear end or both ends thereof respectively, using the number of tracks according to a length of the guard band as the reference value prevents the above-mentioned small track jump from causing the recording head to jump from a recordable area into a recorded area, protecting the recorded data in the recorded area against destruction. If the traverse signal has been caused by the dust, the recording operation may be continued without interruption. It is therefore unnecessary to suspend the recording operation every time such a small track jump has taken place. It will be apparent that, even if an actual track jump, a track jump caused other than the dust, has taken place, data to be destroyed is one immediately following the data written by a current recording operation and therefore can be recovered by rewriting in most cases.

Previously storing recorded data of a recorded area adjacently following a recordable area in a predetermined amount in the buffer memory means allows destroyed data if any to be recovered by performing a re-recording operation.

Performing a recording operation for data recovery starting at a beginning of a recordable area being recorded allows the recording head to only reach the already destroyed area if a track jump occurs again during the re-recording operation, protecting data recorded in a recorded area not previously stored against destruction.

BRIEF DESCRIPTION OF THE DRAWINGS

The above and other objects, features and advantages of the present invention will become more apparent from the following description taken in connection with the accompanying drawings, in which:

FIG. 1 is a diagram illustrating a disc medium capable of recording one program in discrete segments;

FIGS. 2(a) and 2(b) are diagrams illustrating a prior-art recording operation;

FIG. 4 is a diagram illustrating a data structure of UTOC information to be read into the recording/reproducing apparatus practiced as the preferred embodiments of the present invention;

FIG. 10 consists of 10(a), 10(b) and 10(c) are flowchart explaining a recording operation of the first embodiment;

FIG. 13 consists of 13(a), 13(b) and 13(c) are flowcharts explaining a recording operation for overwriting a recording start position at re-recording;

DESCRIPTION OF THE PREFERRED EMBODIMENTS

Before going into a full description of operations of the preferred embodiments of the present invention, a recording apparatus according to the present invention will be outlined.

First, a construction of a recording/reproducing apparatus to be embodied will be described with reference to FIG. 3. Then, segment control data will be described which is written as UTOC information on a magneto-optical disc for use on the above-mentioned recording/reproducing apparatus with reference to FIGS. 4 and 5.

The embodiments to be described are implemented by a recording/reproducing apparatus for example which uses a magneto-optical disc as a recording medium. FIG. 3 is a block diagram of an essential portion of this recording/reproducing apparatus.

Figure 3:
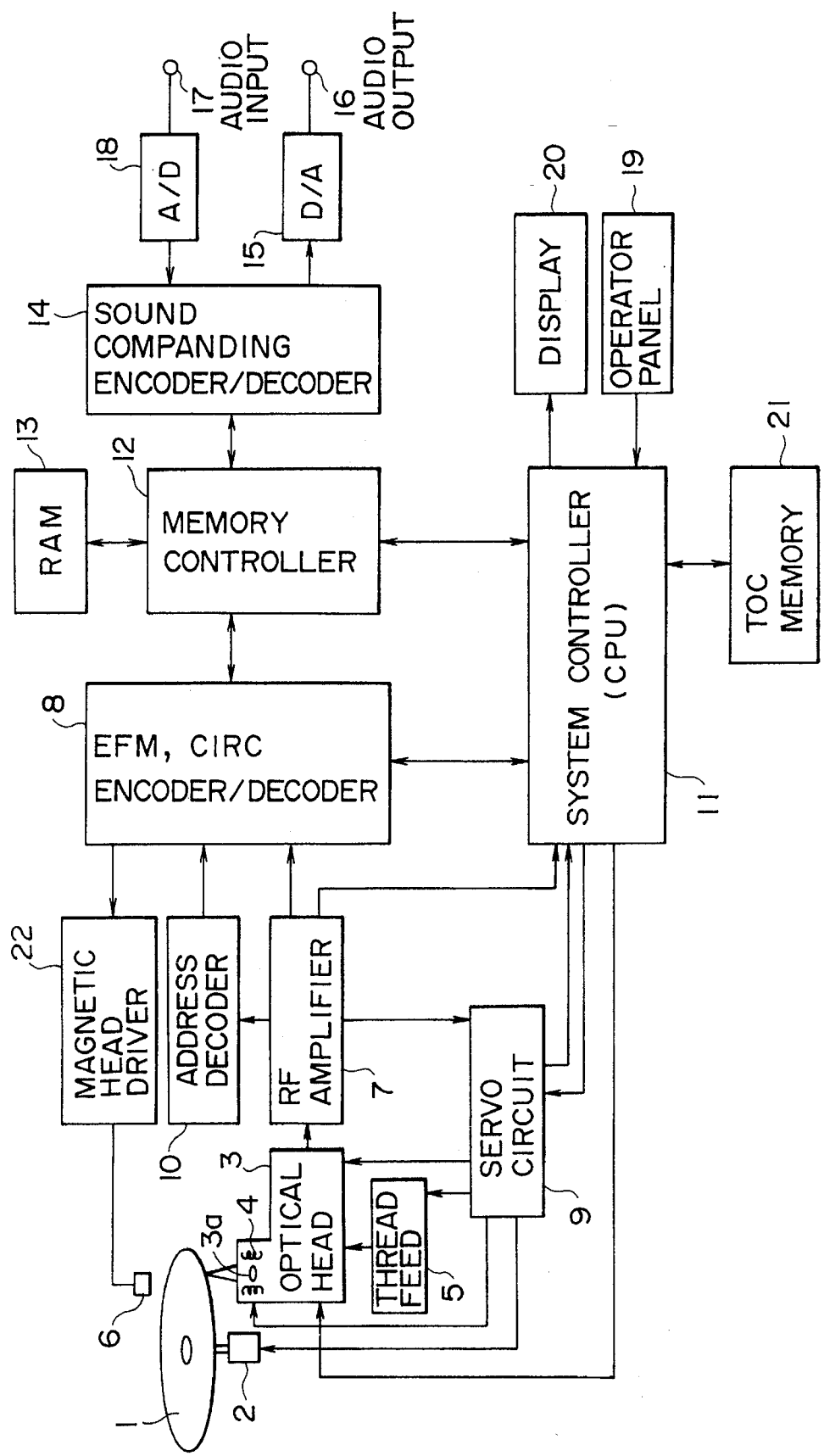
FIG. 3 is a block diagram illustrating a recording/reproducing apparatus practiced as preferred embodiments of the present invention.

Now, referring to FIG. 3, reference numeral 1 indicates a magneto-optical disc recorded with a plurality of programs (audio data) for example and rotationally driven by a spindle motor 2; and reference numeral 3 indicates an optical head for radiating a laser beam onto the magneto-optical disc 1 at a high-level output, in recording, for heating a recording track up to a Curie temperature or, in reproducing, at a low-level output for picking up data from a reflected light by magnetic Kerr effect. For this purpose, the optical head 3 has an optical system comprising a laser diode as laser output means, a polarization beam splitter, and an objective lens, and a detector for picking up the reflected light. The objective lens 3a is displaceably held by a two-axis mechanism 4 in directions radial and vertical to the disc. The optical head 3 in its entirety is adapted to move in the direction radial to the disc by means of a thread feed mechanism 5. Reference numeral 6 in the same figure indicates a magnetic head for applying a magnetic field modulated by supplied data onto the magneto-optical disc. The magnetic head 6 is opposed to the optical head 3 with the magneto-optical disc 1 in between.

When a reproducing operation is performed, information detected by the optical head 3 from the magneto-optical disc 1 is fed to an RF amplifier 7. The RF amplifier 7 performs an arithmetic operation on the received information to extract a reproduced RF signal, a tracking error signal, a focus error signal, absolute-position information (recorded on the magneto-optical disc 1 as a pregroup (wobbling group)), address information, subcode information, and a focus monitor signal. The reproduced RF signal is fed to an encoder/decoder 8. The tracking error and focus error signals are fed to a servo circuit 9. The address information is fed to an address decoder 10 to be demodulated. The focus monitor signal is fed to a system controller 11 comprising a microcomputer for example.

The servo circuit 9 generates servo drive signals based on the tracking error signal and the focus error signal, and a track jump instruction, a seek instruction, and rotational speed detected information coming from the system controller 11 to control the two-axis mechanism 4 and the thread feed mechanism 5, which in turn perform focus and tracking control, thereby controlling the spindle motor 2 to a constant angular velocity (CAV) or a constant linear velocity (CLV).

The reproduced RF signal is fed to the encoder/decoder 8 to be subjected to such processing as EFM (Eight-Fourteen Modulation) demodulation and CIRC (Cross Interleave Reed-Solomon Coding) to be temporarily stored in a buffer RAM 13 by a memory controller 12. Reading of data by the optical head 3 from the magneto-optical disc 1 and transfer of the reproduced data from the optical head 3 to the buffer RAM 13 are performed at a rate of 1.41 Mbits/second.

The data stored in the buffer RAM 13 is read at a timing so that the reproduced data is transferred at 0.3 Mbit/second. The read data is sent to an encoder/decoder 14 to be subjected to reproduced signal processing such decoding compacted sound. A resultant signal is converted by a D-A converter 15 into an analog signal to be fed to a predetermined amplifier via a terminal 16 for reproduced output. For example, the analog signal is output as left-channel and right-channel audio signals.

The absolute-position information obtained by decoding the pregroup information or the address information recorded as data is fed from the address decoder 10 to the system controller 11 via the encoder/decoder 8 to be used for various control operations.

A lock detect signal for a PLL (Phase Locked Loop) circuit for generating a bit clock for a recording/reproducing operation and a monitor signal for monitoring the reproduced data (for right and left channels) for a missing frame synchronization signal are also fed to the system controller 11.

When recording the magneto-optical disc 1, a recording signal (an analog audio signal) applied to a terminal 17 is converted by an A-D converter 18 into a digital signal, which is fed to the encoder/decoder 14 to be encoded for sound compaction. The recording data thus compacted is temporarily stored in the buffer RAM 13 by the memory controller 12. The stored data is read at a predetermined timing to be fed to the encoder/decoder 8, where the data is subjected to encoding processing such as CIRC and EFM to be fed to a magnetic head driver 22.

The magnetic head driver 22, based on the encoded recording data, feeds a magnetic head drive signal to the magnetic head 6 to make it apply a magnetic field having an N or S magnetic pole to the magneto-optical disc 1. At the same time, the system controller 11 sends a control signal to the optical head 3 to instruct it to output the laser beam of recording level.

Reference numeral 19 indicates an operator panel comprising user operated keys. Reference numeral 20 indicates a display comprising a liquid crystal display for example. The keys on the operator panel 19 include a record key, a playback key, a stop key, a music select key, and search keys such as cue and review.

Reference numeral 21 indicates a RAM for holding TOC (Table of Contents) information recorded on the magneto-optical disc 1. The RAM 21 is therefore hereinafter referred to as the TOC memory. Upon loading the magneto-optical disc 1 or immediately before starting a recording or reproducing operation, the system controller 11 drives the spindle motor 2 and the optical head 3 to extract data from a TOC area provided on inner most peripheral for example of the magneto-optical disc. The extracted TOC data is fed to the system controller 11 via the RF amplifier and the encoder/decoder 8 and is stored in the TOC memory 21 to be used for controlling recording/reproducing operations of the disc 1.

Especially with a recordable disk medium such as one mentioned above, segment control data is recorded for allowing one program to be recorded/reproduced as one or more segments. That is, a user TOC area (hereinafter referred to as a UTOC) is provided whose contents can be rewritten according to recording or erasure of data for managing recording data areas. The UTOC has a data structure as shown in FIG. 4 for example.

The UTOC consists of data areas of 4 bytes×587 for example. It starts with a header having a synchronization pattern consisting of one-byte data of all 0's or all 1's, indicating that it is a UTOC. The UTOC also holds data such as a first program number recorded (a first TNO), a last program number recorded (a last TNO), sector usage, disc identification data at predetermined addresses respectively. Further, the UTOC prepares an area for recording corresponding table pointing data (P-DFA to P-TNO255) by which recorded programs are related to a control table to be described.

The control table consists of 255 parts tables 01 to FF.

Each parts table contains a start address and an end address providing a start and an end of an associated segment, mode information about the segment (or track), and, if the segment is linked to another segment, link information indicating a parts table recorded with a start address and an end address of the destination segment.

The track mode information contains information whether the segment is overwrite-protected or duplication-protected, information whether the segment carries audio information, and information whether the recorded audio data is monaural or stereo. The link information specifies parts tables to be linked by using numbers (01 to FF) assigned to them.

That is, in the control table, the parts tables correspond to the segments, one by one. For example, if a program is recorded in three discrete segments, their locations are managed by three corresponding parts tables linked together. Numbers (01 to FF) of these parts tables can be used for numbers of the associated segments.

Each of the parts tables (01 to FF) in the control table indicates contents of its associated segment by corresponding table pointing data (P-DFA to P-TNO255).

P-DFA (Pointer for a start address of a Defective Area) indicates a defective area on the magneto-optical disc 1 and specifies a start parts table of one or more parts tables indicating a defective track (or segment) caused by a scratch or the like. That is, if there is a defective segment, a corresponding segment number 01 to FF is recorded in the corresponding table pointing data P-DFA. In a corresponding parts table, the defective segment is specified by its start and end addresses. If there is another defective segment, it is indicated by a parts table pointed by link information of the first parts table. If there is no defective segment any more, link information of the second parts table is set to "00" for example, indicating that there is no further link.

P-EMPTY (Pointer for an Empty slot on a parts table) indicates a start parts table of one or more unused parts table in the control table. If there is an unused parts table, one of 01 to FF is recorded as the corresponding table indicating data P-EMPTY. If there are more than one unused parts table, they are sequentially specified by link information from the parts table specified by the corresponding table pointing data P-EMPTY to link all the unused parts table in the control table.

For example, with a magneto-optical disc recorded with no data and having no defect, none of the parts tables is used, so that a parts table 01 is specified by the corresponding table pointing data P-EMPTY, a parts table 02 is specified by link information of the parts table 01, a parts table 03 is specified by link information of the parts table 02, and so on until parts table FF is specified to be linked, by way of example. In this case, link information of the parts table FF is set to "00" to indicate that there is no link any further.

P-FRA (Pointer to a start address of a Freely Recordable Area) indicates a data recordable area (including an erased area) on the magneto-optical disc 1 and specifies a start parts table of one or more parts tables respectively indicating a track (or segment) providing a recordable area. That is, if there is a recordable area, one of 01 to FF is recorded in the corresponding table pointing data P-FRA. In a corresponding parts table, a segment providing the recordable area is indicated by its start and end addresses. If there are more than one such a segment, that is, if there are more than one parts table, they are sequentially linked by link information up to a parts table whose link information is set to "00".

Figure 5:
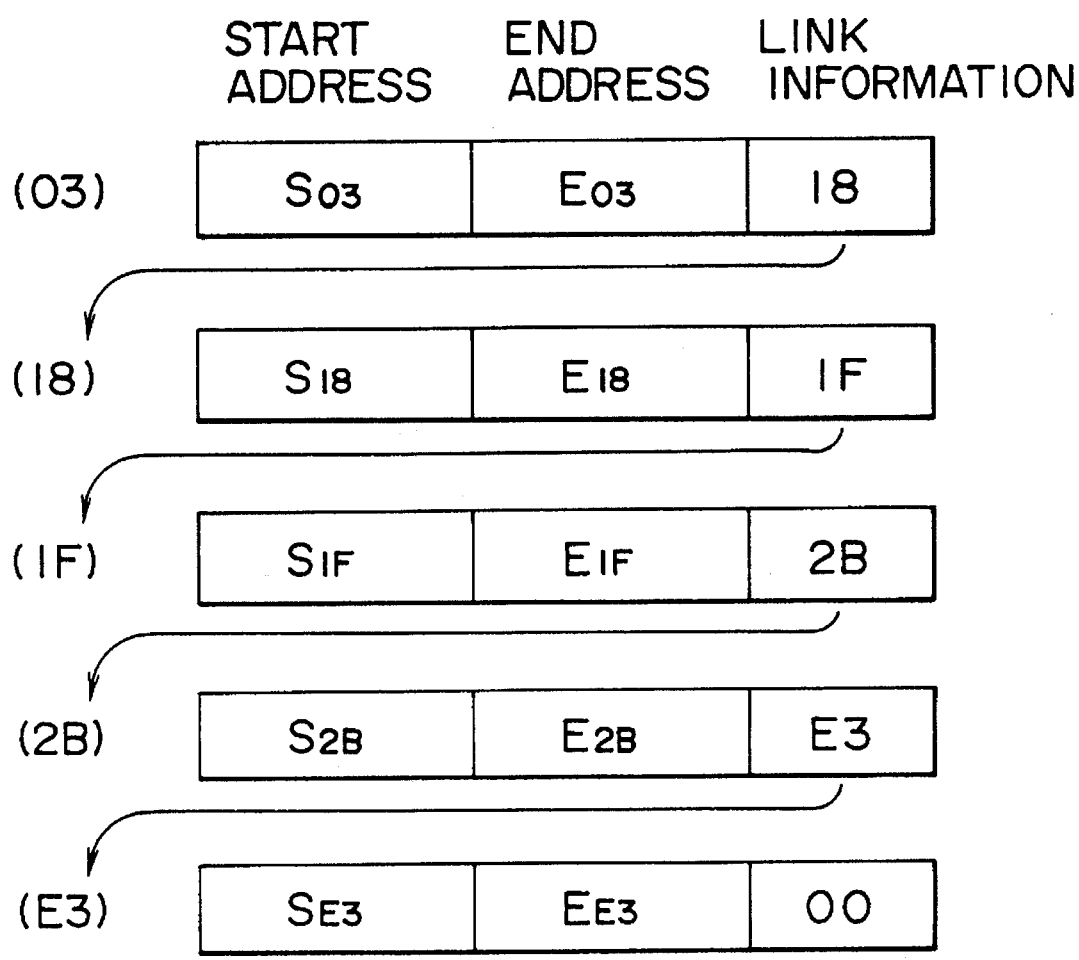
FIG. 5 is a diagram illustrating a stage of segments controlled by corresponding table pointing data and parts tables.

FIG. 5 schematically illustrates how segments providing recordable areas are managed. This indicates a state in which, if segments 03, 18, 1F, 2B, and E3 provide recordable areas, they are sequentially linked with the start segment 03 specified in the corresponding table pointing data P-FRA. The above-mentioned defective areas and unused parts tables are also managed in the same manner.

P-TNO1 to P-TNO255 (Pointers for a start address of track n) indicate programs recorded on the magneto-optical disc 1 respectively. For example, the corresponding table pointing data P-TNO1 specifies a parts table which indicates a first segment in terms of time of one or more segments in which one piece of music, or one program, is recorded. If, for example, a program providing a first piece of music is recorded not divided over tracks, or if it is recorded in one segment, the recorded segment is specified by its start and end addresses held in a parts table pointed by the P-TN01. If, for example, a program providing a second piece of music is dividedly recorded in two or more discrete segments on the disc, these segments are specified in the order of recording time to indicate a recorded location of the program. That is, a parts table specified by the corresponding table pointing data P-TNO2 is linked by its link information to a second parts table which in turn is linked by its link information to a third parts table, and so on in the order of recording time up to a parts table whose link information is set to "00" (the same state as shown in FIG. 5). Thus, since all segments recorded with data constituting the second piece of music for example are sequentially stored, using the UTOC data allows the optical head 3 and the magnetic head 6 to access these discrete segments, reproducing the second piece of music or overwriting it efficiently.

The recording/reproducing apparatus practiced as the first embodiment of the invention on which the magneto-optical disc 1 recorded with the above-mentioned UTOC data manages the recordable areas on the disc by means of the UTOC data stored in the TOC memory 21 to control recording/reproducing operations. Especially, in recording, the UTOC data is searched for a recordable area on the disc and music data is recorded in it; if the recordable area is immediately preceded or followed by a recorded area, a guard band is provided on the recordable area at its front end and/or rear end to protect the adjacent recorded area from being overwritten. And, a criterion by which to determine an occurrence of a track jump during a recording operation is established according to a preset length of the guard band, executing a re-recording operation efficiently.

Figure 6:
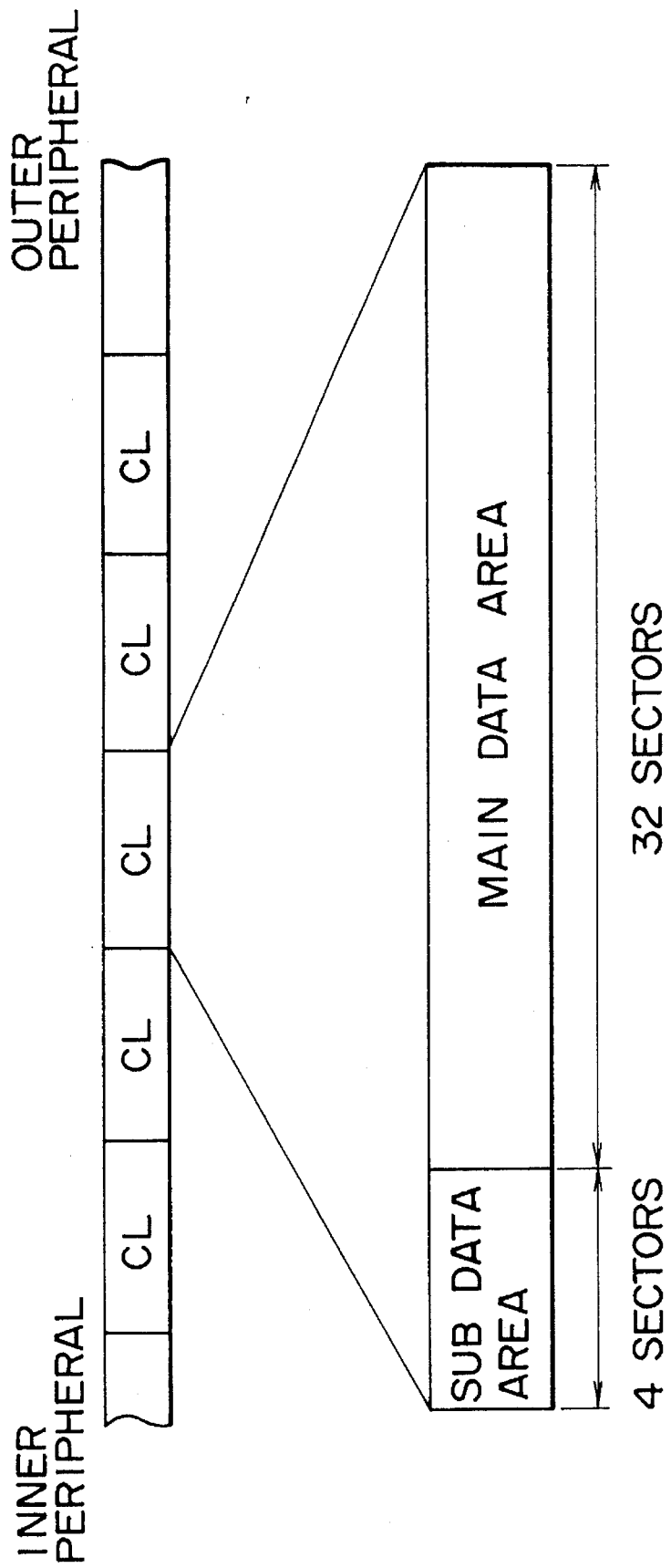
FIG. 6 is a diagram illustrating a track structure of a recording medium for use on the embodiments.

First embodiment:

Referring to FIG. 6, a recording track on the magneto-optical disc 1 is made up of contiguous clusters. Each cluster CL consists of a sub data area made up of four sectors (one sector=2,352 bytes) and a main data area made up of 32 sectors. Data is recorded on a cluster basis. One cluster is equivalent to two to three tracks. An address is recorded on a sector basis.

Figure 8:
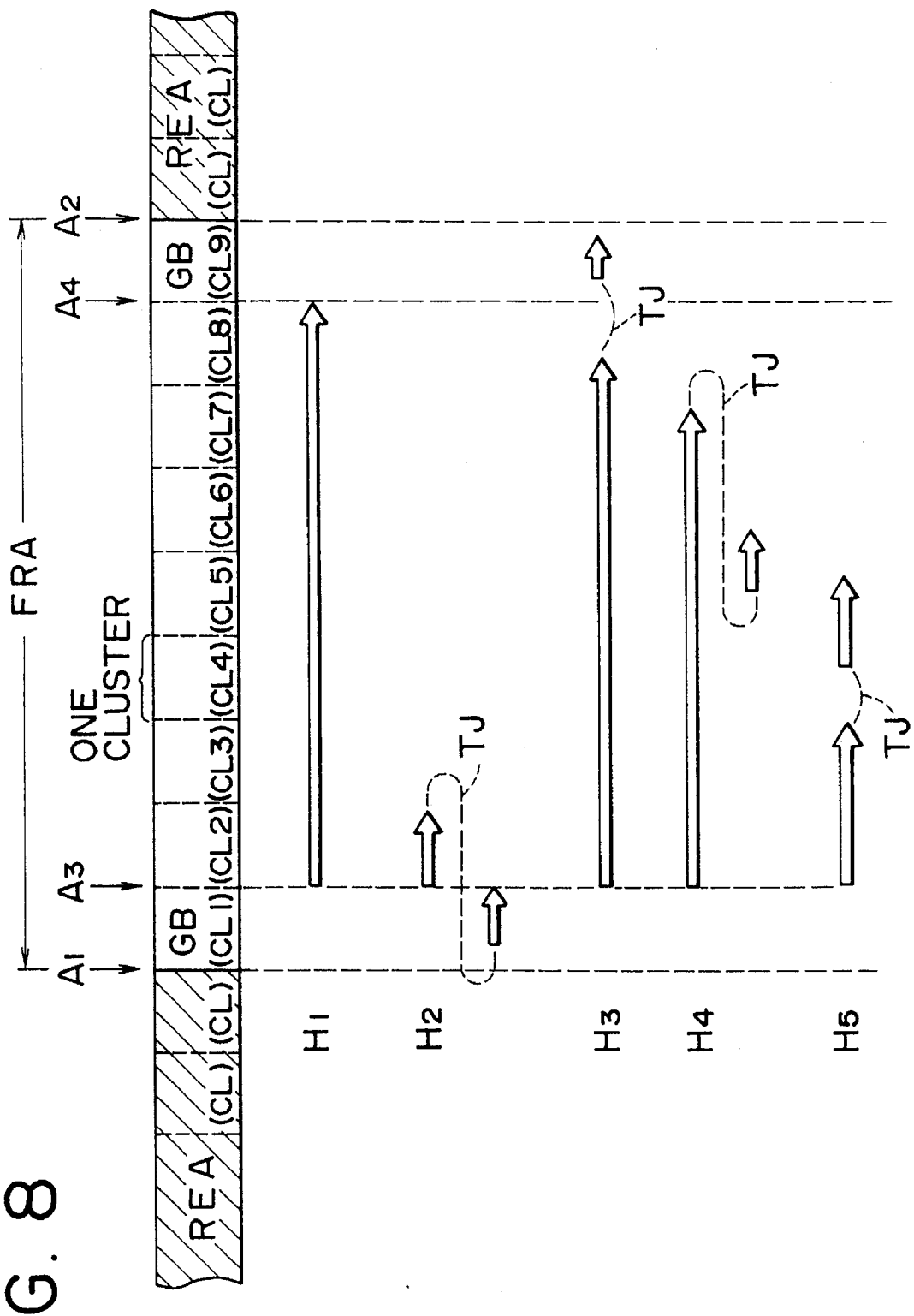
FIG. 8 is a schematic diagram illustrating a guard band as a first embodiment of the present invention.

Now, as shown in FIG. 8, suppose a case in which a segment specified by address A1 and address A2 consisting of clusters CL1 through CL9 for example provides a freely recordable area FRA and the FRA is adjacently preceded and followed by recorded areas respectively. The addresses A1 and A2 are stored as start and end addresses respectively in a parts table (or another parts table linking thereto by its link information) specified by corresponding table pointing data P-FRA as UTOC data.

In this embodiment, a recording operation is performed so that a guard band GB is formed on the freely recordable area FRA at a portion adjacent to the recorded area REA in a length equal to one cluster. To be specific, the system controller 11 performs an operation to shift an address indicating a recording start location from the start address A1 to an address A3 by one cluster and an address indicating recording end address from the end address A2 back to an address A4 by one cluster, thus setting a recordable area. Consequently, the recording head scans between addresses A3 and A4 as indicated by H1 in FIG. 9. Therefore, clusters CL1 and CL9 provide guard bands respectively in which no data will be recorded.

The system controller 11 detects an occurrence of a track jump by detecting a traverse signal generated in the servo circuit 9. Since the traverse signal is caused every time a laser spot traverses a track, counting the number of traverse signals allows to determine how many tracks have been traversed. It should be noted, however, that a traverse signal may be also caused by a foreign matter on the disc, such as a dust.

Figure 7A:
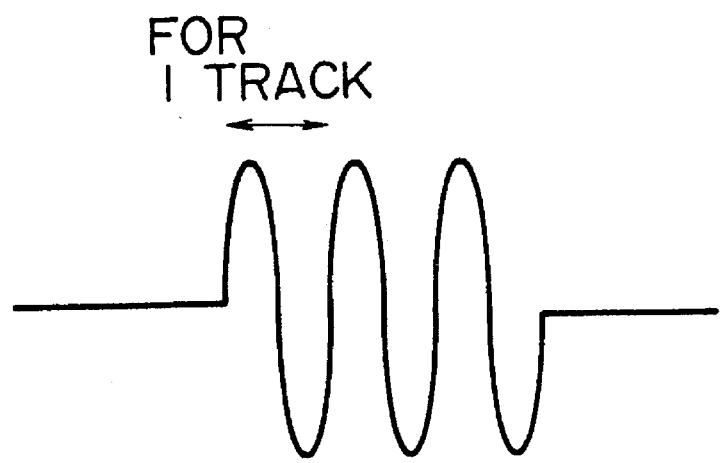
FIGS. 7(a) and 7(b) are schematic diagrams illustrating a track jump.

The system controller counts the number of traverse signals and, having detected a track jump over three or more tracks as shown in FIG. 7(a), determines an occurrence of a track jump, immediately suspending the recording operation. Then, if possible, the system controller 11 performs a re-recording operation. The system controller can perform a re-recording operation if a track jump TJ has occurred in the recordable area as indicated by scan H4 or H5 of FIG. 8 for example.

Figure 7B:
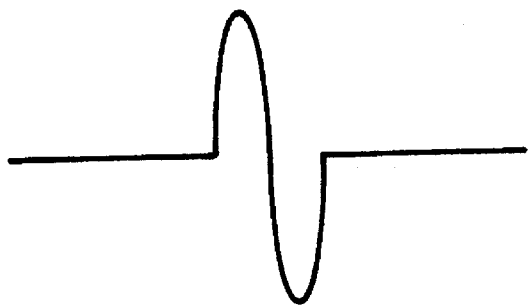

If one or two traverse signals are detected singularly as shown in FIG. 7(b), the system controller regards that they have been caused by a dust on the disc for example, continuing the recording operation. Even if one or two traverse signals singularly detected have been caused by an actual track jump over one or two tracks, scanning by the recording head will not reach the recorded area REA beyond the guard band GB as indicated by H2 or H3 of FIG. 8 because the guard band consists of one cluster (for two to three tracks). Therefore, such a track jump will not lead to a destruction of recorded data. Whether an actual track jump or a false track jump has occurred is accurately determined by checking continuity of absolute-position information recorded as a pregroup on the disc. If an actual track jump is determined, re-recording is performed.

FIG. 10 is a flowchart describing the recording processing by the system controller 11 which performs the above-mentioned recording operation control. Steps in the flowchart are indicated by F101 through F123.

When the magneto-optical disc 1 is loaded, the system controller 11 reads the TOC information into the TOC memory 21 as mentioned above. Therefore the UTOC data is also stored in the TOC memory. The system controller 11 executes a routine of FIG. 10 by using the stored UTOC data when a recording operation is instructed on the operator panel 19 for example.

First, the system controller 11 searches a parts table specified in the corresponding table pointing data P-FRA in the UTOC data for start and end addresses of a freely recordable area FRA (F101 and F102). Then, the system controller determines whether a segment length (that is, the end address minus the start address) of the freely recordable area FRA is greater than double the guard band length (that is, greater than two clusters) (F103). If the segment length is equal to or smaller than double the guard band length, the system controller determines that the FRA is unrecordable and searches a next parts table directly linked to the current parts table for start and end addresses to calculate its segment length. That is, a freely recordable area FRA whose segment length is greater than double the guard band length is found in steps F101 through F103. The obtained FRA provides an area in which data is recorded.

When the FRA to be recorded has been specified, the system controller 11 shifts the FRA's start address A1 forward to the address A3 by the guard band length (one cluster) and establishes the address A3 as the actual recording start address (F104). At the same time, the system controller shifts the FRA's end address A2 back to the address A4 by the guard band length (one cluster) and establishes the address A4 as the actual recording end address (F105).

When the actual recording start and end addresses have been established, the system controller 11 positions the recording head to the recording start address A3 to start recording data from it (F106, F107, and F108). That is, a recording scan starts as indicated by H1 of FIG. 8, thus recording the data fed to the recording head via the buffer RAM 13.

During the recording scan, the system controller 11 monitors whether the head position has reached the recording end address A4, a track jump over three tracks or more has been detected by checking a traverse signal, and a discontinuity has been detected in the absolute-position information obtained from the pregroup on the disc (F109, F110, and F111).

If the head position has reached the recording end address A4 with no traverse signal for three tracks or more and no discontinuity in the absolute-position information detected, the system controller determines that the recording operation on that segment has completed normally and terminates the recording operation (F109 to F122). Thus, this FRA has become a recorded area REA. Accordingly, the system controller 11 changes corresponding data in the UTOC data and rewrites the UTOC data area on the disc (F123).

Figure 14:
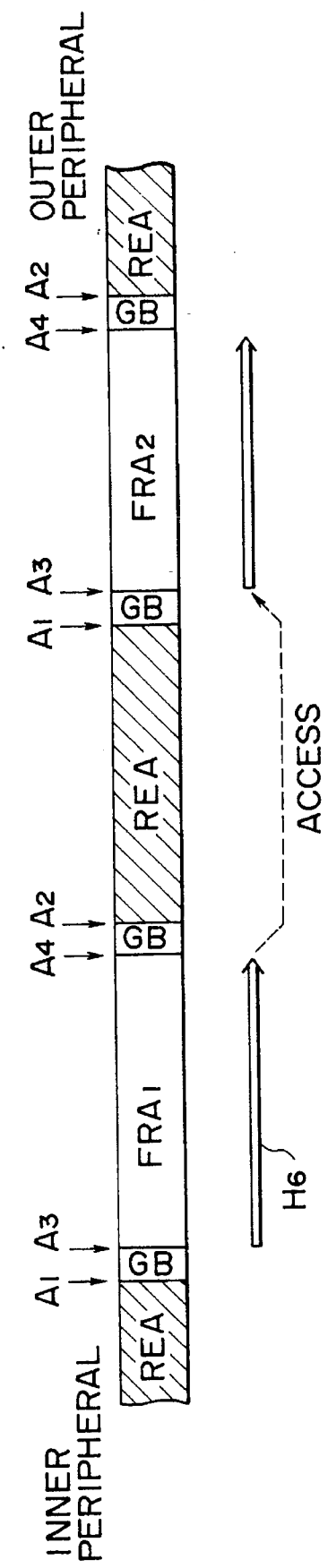
FIG. 14 is a diagram illustrating a recording operation performed over a plurality of segments of the embodiments.

As described with reference to FIG. 1, since the magneto-optical disc for use on this embodiment allows data (for example, a program) to be dividedly recorded in two or more segments, the system controller 11 continues the recording operation by accessing a next freely recordable area FRA2 upon completion of the recording on the first FRA1 as indicated by H6 of FIG. 14. In this case, too, data is recorded on the FRA2 between addresses A3 and A4 so that guard bands are formed as described above. The system controller rewrites the UTOC data collectively upon completion of the recording on one segment or all of multiple segments (freely recordable areas).

During data recording on the freely recordable area FRA, the system controller 11 monitors an occurrence of a traverse signal. If a detected traverse signal is for one or two tracks, the system controller continues the recording operation by ignoring the traverse signal. If the detected traverse signal is for three or more tracks, the system controller regards it as an occurrence of a track jump and immediately suspends the recording operation to prevent a data destruction (F110 to F112).

Since it is possible that a data destruction has already occurred upon detection of the track jump, the system controller performs re-recording if the destroyed data can be recovered. Especially with this embodiment, the guard band GB prevents the recording head from getting out of the freely recordable area FRA being recorded if a jump over three tracks or more occurs. Therefore, in most cases, the destroyed data can be recovered by data remaining in the buffer RAM 13. It is apparent that suspending the recording will not destroy data three tracks or more away from a point at which the track jump occurred.

Consequently, the system controller first detects absolute-position information generated after a track jump (F113) and, based on the information, determines whether the track jump occurred toward an inner peripheral of the disc or toward an outer peripheral (F114). If the track jump is found happening toward the inner peripheral of the disc, from cluster CL7 to cluster CL5, as indicated by scan H4 of FIG. 8 for example, it is regarded that a data destruction occurred starting with a cluster (CL4 or CL5) having a sector immediately before a sector containing the read absolute-position information; therefore, the system controller obtains that cluster (CL4 or CL5) (F115).

On the other hand, if the track jump is found happening toward the outer peripheral of the disc, from cluster CL7 to cluster CL5 as indicated by scan H5 of FIG. 8 for example, it is regarded that the data recording error occurred starting with a cluster (CL3) having a sector containing absolute-position information detected last before the track jump occurred. Therefore, the system controller obtains that cluster (CL3).

Meanwhile, even if a detected traverse signal indicates that only one or two tracks have been traversed, a recording error or a data destruction may have happened actually in a freely recordable area FRA being recorded (as indicated by H2 or H3 of FIG. 8 for example). Therefore, the system controller monitors associated absolute-position information for any discontinuity as mentioned above. If a discontinuity is found, the system controller regards it that a track jump has occurred and suspends the recording operation (F111 to F117). The system controller then obtains a cluster with which to start a re-recording operation for data recovery or error correction (F118). This cluster is a cluster CL containing an address immediately before a point at which the discontinuity of absolute-position information was detected or a cluster CL containing an address immediately before an address at which the discontinuity was detected, whichever is nearer the inner peripheral of the disc.

When the cluster to be re-recorded has been obtained in F115, F116, or F118, the system controller checks the buffer RAM 13 for the data recorded between that cluster and the cluster in which the track jump occurred inclusive. If the data is not found, data recovery is impossible, so that the system controller terminates the recording processing as a recording error (F120). If the data is found stored, the system controller sets a start address of the obtained cluster as a recording start address and restarts the data recording operation with that cluster (F121 to F106).

Thus, by means of the above-mentioned processing, the freely recordable area FRA is formed with the guard band GB for data recording and, even if a possibility of a track jump which is prevented by the guard band from causing the recording head to jump to another area for a recording error has been detected, the system controller does not immediately determine it to be a track jump. Rather, the system controller continues the record operation until it detects the discontinuity in absolute-position information to confirm the occurrence of the track jump. That is, a traverse signal generated by a foreign matter such as a dust on the disc will not suspend the recording operation.

If a track jump occurs, the system controller immediately performs a data recovery operation to continue the recording operation.

It is apparent that, with the processing described by the flowchart of FIG. 10, all freely recordable areas to be recorded are formed with the guard band GB respectively; actually, however, those freely recordable areas having no immediately adjacent recorded areas need not always be provided with the guard band. Rather, it is preferable for such freely recordable areas not to have the guard band in order to leave more data recording space in them.

Figure 11A:
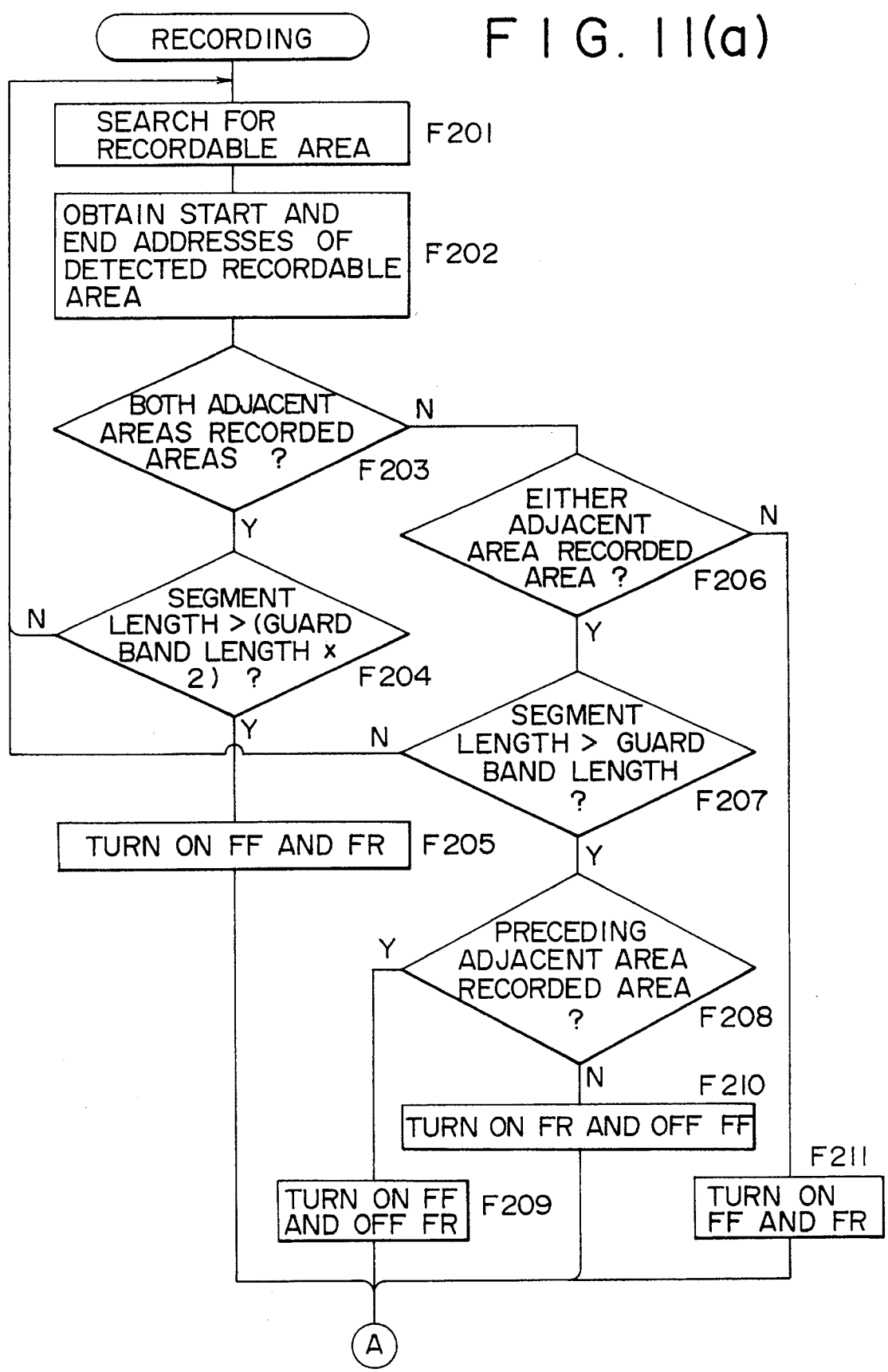
FIG. 11 consists of 11(a), 11(b) and 11(c) are flowchart explaining a recording operation of the first embodiment.
Figure 11B:
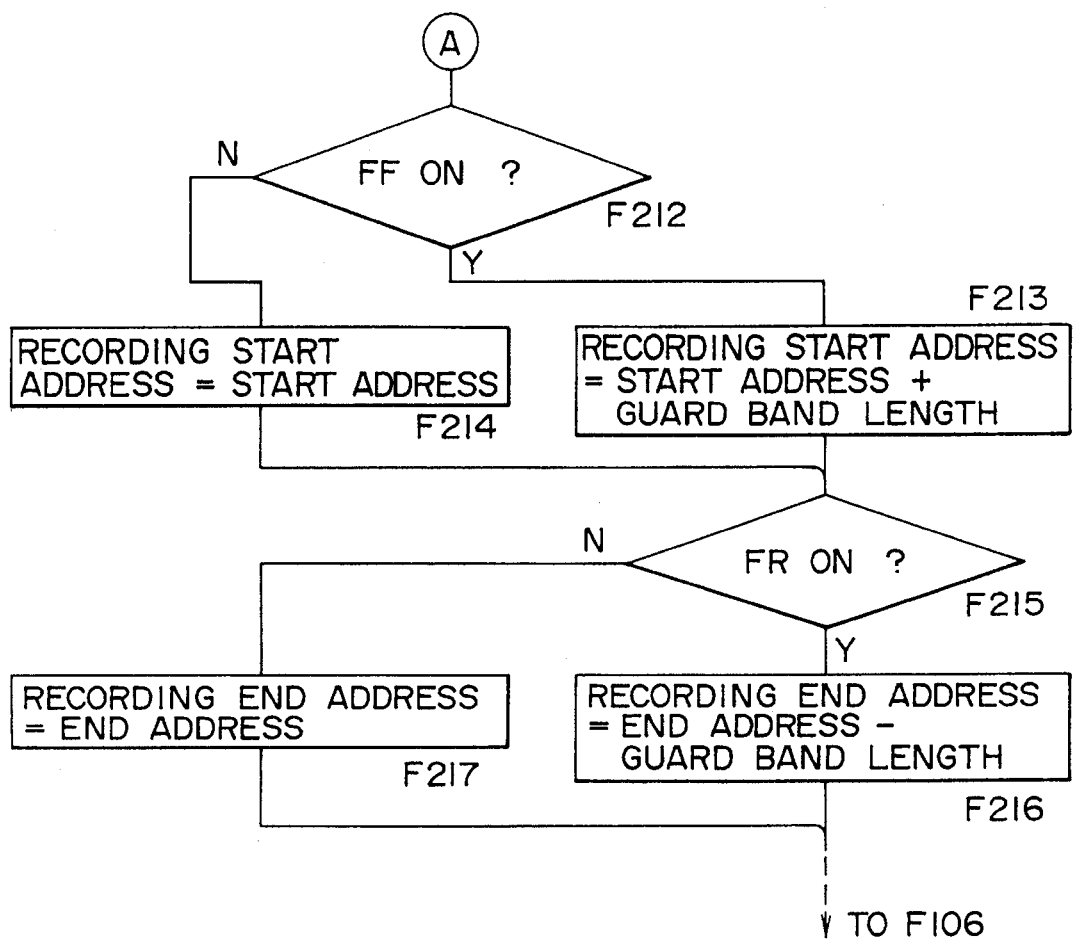
Figure 11:
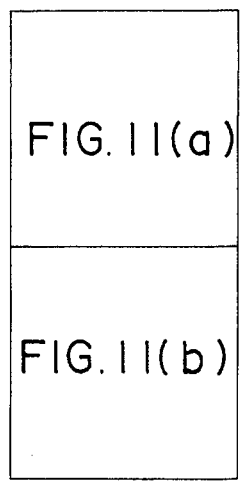

Consequently, it is preferable that processing from F101 to F105 of FIG. 10 be replaced by processing from F201 to F217 of FIG. 11. To be specific, when a freely recordable area FRA has been found at starting a recording operation (F210, F202), the system controller determines whether areas adjacently preceding and following the FRA respectively are recorded areas REA's (F230). If both REA's are found recorded, the system controller determines whether a segment length of each REA is greater than double (equivalent to two clusters) the guard band length as shown in FIG. 10 (F204). If the segment length is found greater, the system controller determines that each REA is recordable and turns on flags FF and FR (F205).

If either of areas adjacent to the obtained freely recordable area FRA is not recorded area REA, the system controller determines which one is recorded (F206). Since the guard band may be provided on the FRA only at one end thereof, the system controller determines whether its segment length is greater than the guard band length (equivalent to one cluster) (F207). If the segment length is found greater, the system controller determines the area to be recordable and determines whether the area is before or after the FRA (F208). If the area is found before the FRA, the system controller turns on the flag FF and turns off the flag FR (F209); if the area is found after the FRA, the system controller turns off the flag FF and turns on the flag FR (F210). If neither of the areas are found recorded areas, no guard band need be provided. In this case, the system controller determines these areas to be recordable and turns off the flags FF and FR (F211).

When the flag FF is on, the system controller adds the guard band length to the start address A1 to provide the recording start address A3 (F212 to F213). When the flag FF is off, the start address A1 is used as the recording start address without change (F212 to F214). In this case, the guard band is not formed on the freely recordable area FRA at its front end. When the flag FR is on, the system controller subtracts the guard band length from the end address A2 to provide the recording end address A4 so that the guard band is formed on the FRA at its rear end (F215 to F216). When the flag FR is off, the end address A2 is used as the recording end address without change (F215 to F217). In this case, the guard band is not formed on the FRA at its rear end.

Subsequently, the processing proceeds to step F106 of FIG. 10 where the above-mentioned operation is performed, realizing effective usage of recordable areas.

It is apparent that variations may be made to this embodiment. For example, the guard band may be provided only at either of the front end or the rear end of a recordable area regardless of whether the areas adjacent thereto are recorded areas or not. Although, in this embodiment, the occurrence of a track jump is determined when a traverse signal generated over three or more tracks has been detected, the number of tracks depends on the guard band length and therefore, if the guard band is longer than that used in this embodiment, a track jump may be determined by a traverse signal generated over four or more tracks for example. This is because a traverse signal generated over the number of tracks that does not cause the recording head to jump out of a segment being recorded may be regarded, for the time being, as a detection error caused by a foreign matter such as a dust on the disc to continue the recording operation without destroying data recorded in other areas.

Thus, setting the guard band length and the track jump detection level in a correlated relation enhances accuracy and speed of the track jump detection for preventing data destruction, securely preventing recorded data from being destroyed.

Second embodiment:

The present invention is also applied to a recording method which does not use the guard band used on the first embodiment in recordable areas. An embodiment of such a method will be described below as a second preferred embodiment of the invention.

As mentioned in the description of the first embodiment, even a small track jump generated over one or two tracks may have destroyed recorded data. However, storing a predetermined amount (one cluster for example) of data of an immediately adjacent recorded area before starting a recording operation allows destroyed data to be recovered by performing a re-recording operation. By detecting a track jump in the same manner as with the first embodiment, this setup can prevent an irrecoverable destruction of recorded data from happening and enhance recording efficiency.

In the second embodiment according to the invention, the system controller 11, when recording data, searches UTOC data for a recordable area on the disc and records the data to the area. If a recorded area is adjacently located before the recordable area, the system controller reads recorded data from a predetermined location in the recorded area and stores the read data in the buffer RAM 13 before starting a recording operation on the recordable area. If a track jump occurs during the recording operation, destroying data in the adjacent recorded area, the system controller writes the stored data on the recorded area for data recovery. It should be noted that a location at which a data write operation for data recovery starts is not set in the area where the data destruction occurred; rather, the data write operation starts from a beginning of the recordable area to write the data recorded there all over again and continues into the recorded area to write the stored data.

This second embodiment will be described below by referring to several drawings.

Figure 9:
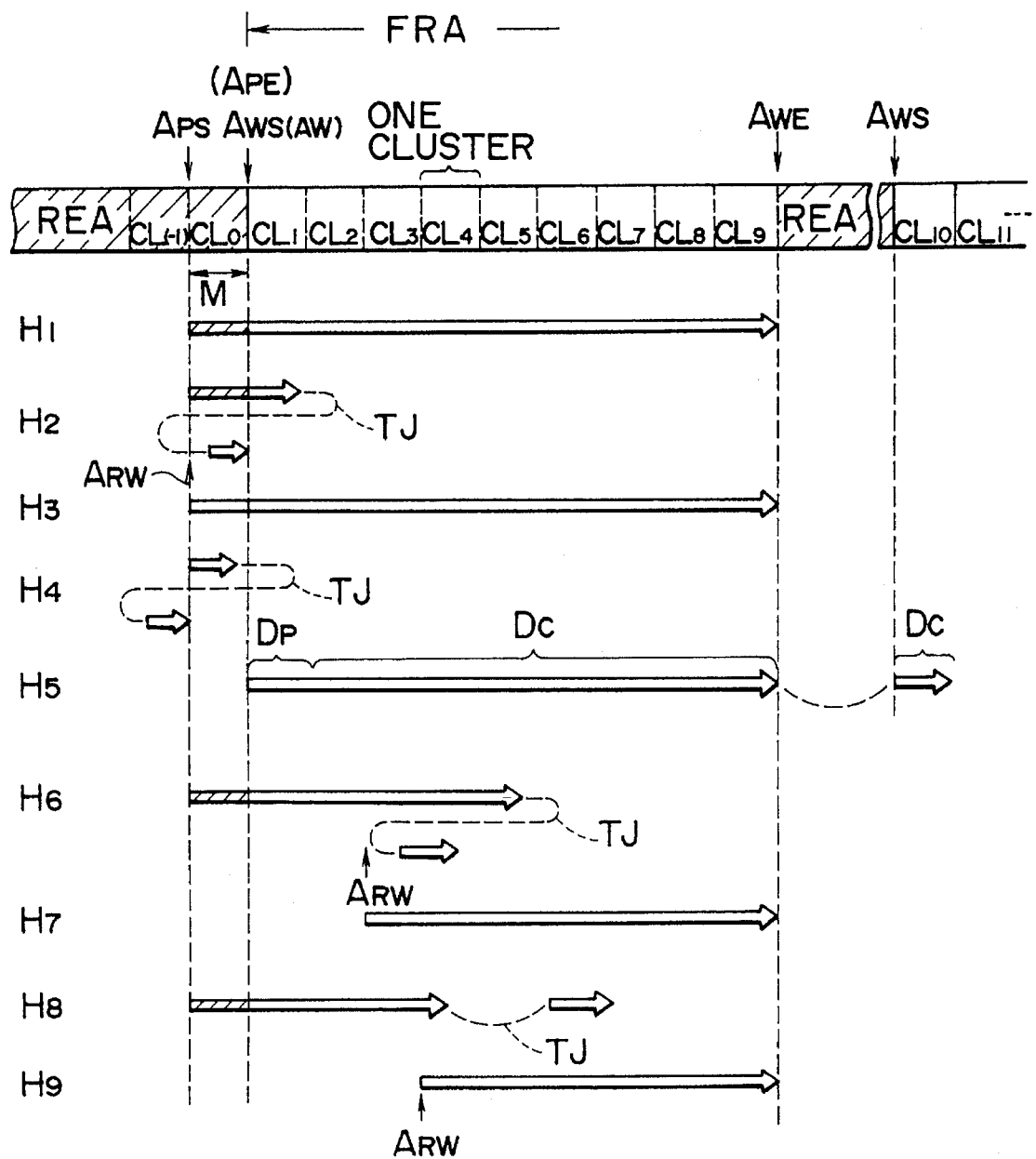
FIG. 9 is a schematic diagram illustrating a data rewriting as a second embodiment of the present invention.

It is supposed, as shown in FIG. 9, that a segment (at addresses AWS to AWE) containing clusters CL1 through CL9 is a freely recordable area FRA and it is immediately preceded and followed by a recorded area REA respectively, by way of example. The addresses AWS and AWE are stored as start and end addresses in a parts table specified in corresponding table pointing data PFRA as UTOC data (or they are stored in another parts table linked from that parts table by link information).

In the second embodiment, the system controller, before starting a recording operation, reads data recorded in one cluster for example in the recorded area REA at and end adjacent to the freely recordable area FRA. To be specific, the system controller 11 first obtains an address one cluster before the recording start address AWS to make the obtained address a past data read start address APS and then causes the recording/reproducing head (comprising the optical head 3 and a magnetic head 6) to perform a reproducing scan starting with the address APS, starting a recording scan when the recording/reproducing head has reached the recording start address AWS. These scans are indicated by H1 of FIG. 9. In the figure, a hatched portion represents the reproducing scan while a non-hatched portion the recording scan.

The system controller 11 detects an occurrence of a track jump by detecting a traverse signal generated in the servo circuit 9. Since the traverse signal is caused every time a laser spot traverses a track, counting the number of traverse signals allows to determine how many tracks have been traversed. It should be noted, however, that a traverse signal may be caused by a foreign matter such as a dust on the disc. The system controller counts the number of traverse signals and, having detected a track jump over three or more tracks as shown in FIG. 7(a), determines an occurrence of a track jump, immediately suspending the recording operation. Therefore, there is little possibility that data recorded before these three or more is destroyed. Even if the data is destroyed, the stored data for one cluster (equivalent to two to three tracks) can be used to record the data again for data recovery.

If one or two traverse signals are detected singularly as shown in FIG. 7(b), the system controller regards that they have been caused by a dust on the disc for example, and does not suspend the recording operation immediately because of the detection. Rather, the system controller subsequently confirms associated absolute-position information recorded as a pregroup on the disc and checks the absolute-position information for a discontinuity. If the discontinuity is found, the system controller determines that a track jump has occurred.

Even if one or two traverse signals singularly detected have been caused by an actual track jump over one or two tracks, destroying recorded data for one to two tracks until confirmation of the track jump by absolute-position information, the past recorded data for one cluster can be recovered because it has been stored in advance.

Figure 12A:
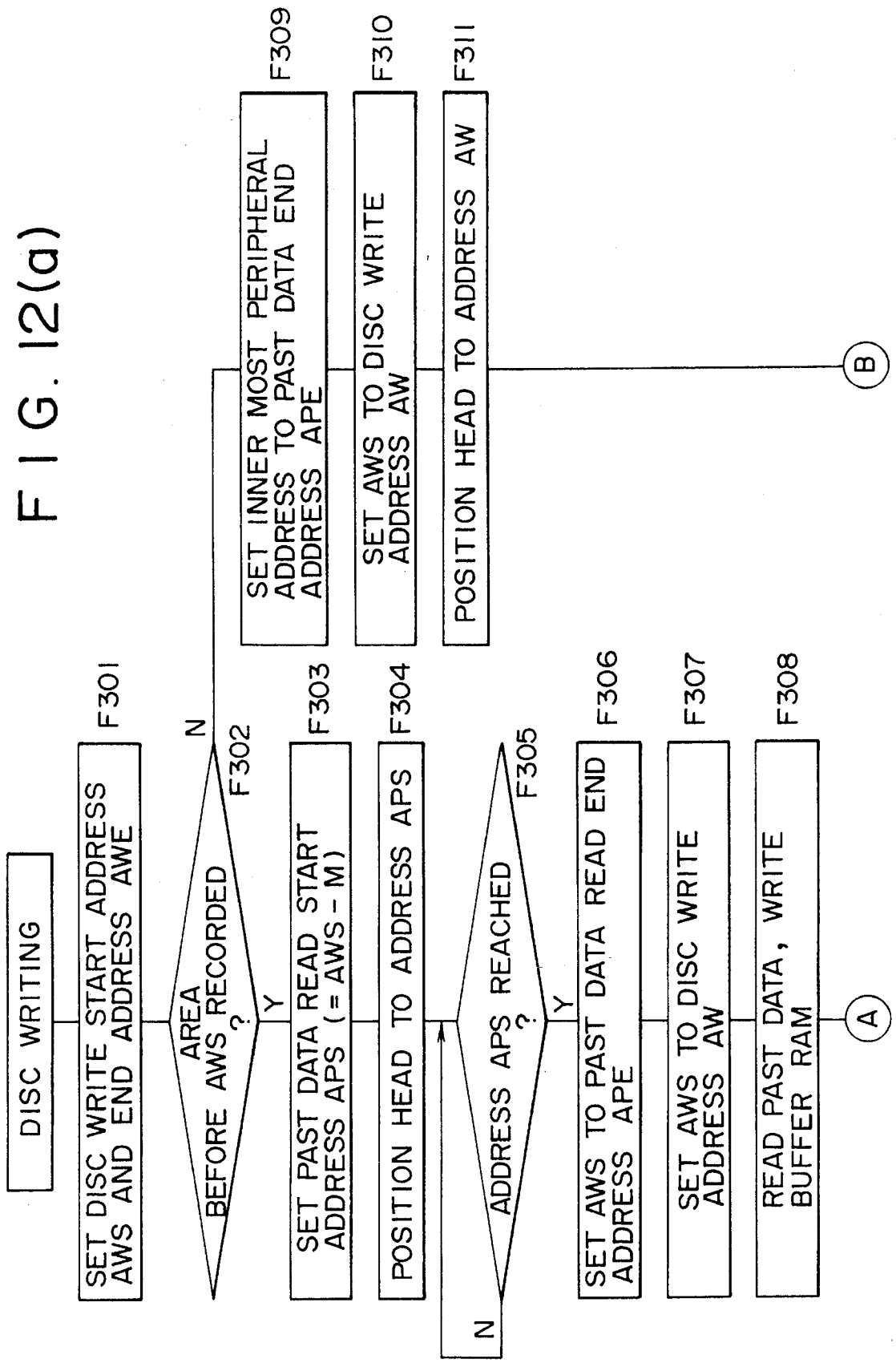
FIG. 12 consists of 12(a), 12(b) and 12(c) are flowcharts explaining a recording operation for writing a recording start position as an offset at re-recording.

FIG. 12 is a flowchart describing the recording processing by the system controller 11 which performs the above-mentioned recording operation control. The steps in the flowchart are indicated by F301 through F333 respectively.

Following registers are provided for the address management for controlling a recording/reproducing head scan position on the disc and for the read/write control on the buffer RAM 13:

AWS for a disc writing start address, or an address indicating a location at which a current write operation starts (=a start address in a recordable area);

AWE for a disc writing end address, or an address indicating a location at which the write operation terminates (=an end address in a recordable area);

APS for a past data reading start address, or an address at which a past data reading operation starts;

APE for a past data reading end address, or an address indicating a last position of a past data reading range;

AW for a disc writing address, or an address indicating a location at which a disc writing operation starts (this address is updated by re-writing or the like);

AWC for a current writing address, or an address indicating a location being currently written;

ATJ for an address immediately after track jump detection, or an address detected immediately after a track jump;

ARW for disc rewriting address, or an address indicating a start location for rewriting after a track jump;

PR for a read pointer, or a pointer for specifying a buffer RAM reading address; and PW for a write pointer, or a pointer for specifying a buffer RAM writing address.

When the magneto-optical disc 1 is loaded, the TOC information is read as mentioned above and therefore the UTOC data shown in FIG. 4 is stored in the TOC memory 21. The system controller 11 executes a routine of FIG. 12 by using the stored UTOC data when a recording operation is instructed on the operator panel 19 for example.

First, the system controller 11 searches a parts table specified in the corresponding table pointing data P-FRA in the UTOC data for start and end addresses of a freely recordable area FRA and makes the start address a disc writing start address AWS and the end address a disc writing end address AWE (F301). Then, the system controller determines whether an area immediately before the FRA is a recorded area REA or not.

If the area immediately before the freely recordable area FRA to be recorded is a recorded area REA as shown in FIG. 9, the system controller obtains a location one cluster (M) before the disc writing start address AWS and makes the location a past data reading start address APS (F303). Then, the system controller positions the recording/reproducing head to the APS (F304, F305).

The system controller sets the disc writing start address AWS to the past data reading end address APE (F306) and the disc writing start address AWS to the disc writing address AW (F307) to read the data recorded on the disc from the past data reading start address APS into the buffer RAM 13 (F308).

Figure 15A:
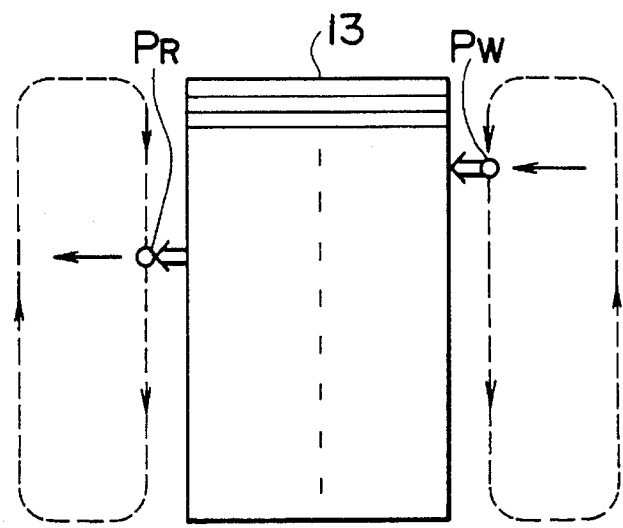
FIG. 15 consists of 15(a), 15(b) and 15(c) are diagrams illustrating a read pointer and a write pointer of a memory unit of the embodiments.

It should be noted that buffer RAM read and write operations are controlled by the write pointer PW and the read pointer PR respectively whose addresses are specified in a storage area of the buffer RAM 13 as shown in FIG. 15(a) to be updated to next address locations respectively every time a read operation and a write operation take place. When these addresses have reached final locations respectively, they return to their start locations.

Figure 15B:
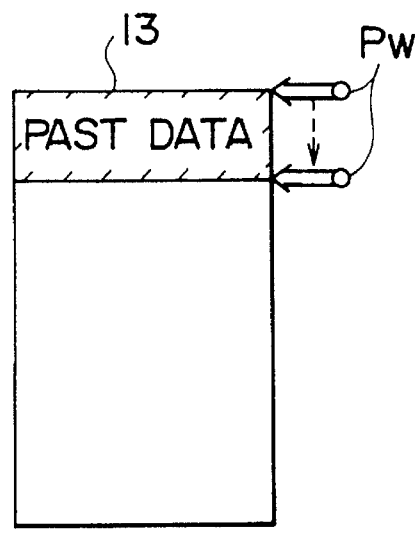

The past data read after step F308 is sequentially stored in the buffer RAM 13 at locations specified by the write pointer PW. When a reproducing scan is continued until it reaches the past data reading end address APE (that is, it matches the writing address AW in this case) for example, the past data is stored in the buffer RAM 13 as shown in FIG. 15(b).

If the area before the freely recordable area is found other than a recorded area REA, the past data need not be read, so that the system controller sets a disc inner most peripheral address to the past data reading end address APE (F309) and the disc writing start address AWS to the disc writing address AW (F310) to position the recording/reproducing head to the disc writing address AW directly (F311). It should be noted that the disc inner most peripheral address is set to the APE to be used for a comparison operation of step F322 to be described.

When the recording/reproducing head has reached the disc writing address AW because of a scan for reproducing past data or because of a direct access, the system controller terminates a past data reading operation if it has been done (F312) and stores input data fed from the terminal 17 into the buffer RAM 13 (F313). The system controller then reads the input data stored in the buffer RAM 13 and supplies it to the magnetic head 6 to start writing it to the disc 1 (this is a write operation to be executed this time) (F314).

Figure 15C:
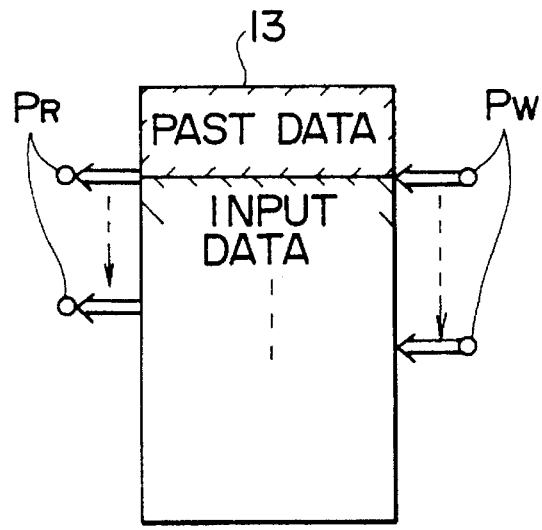

The data supplied from the terminal 17 and put through sound compaction processing to be recorded this time is stored in the buffer RAM 13 subsequent to the past data by the write pointer PW as shown in FIG. 15(c). To supply the data to be recorded this time to the magnetic head 6, the read pointer PR has been set at starting a read operation to an address next to the area recorded with the past data to read the input data at a predetermined timing.

Subsequently, a recording scan is performed from the disc writing start address AWS to the disc writing end address AWE as indicated by H1 of FIG. 9 to record the data from the magnetic head 6 to the disc 1.

During this recording scan, the system controller 11 captures a location currently being scanned as the current writing address ACW and monitors whether the head position has reached the recording end address AWE (that is, ACW=AWE) and a track jump has been detected (F315, F316, and F317). It should be noted that, as mentioned earlier, a track jump is detected by checking a traverse signal for an occurrence of an track jump over three or more tracks or by checking absolute-position information obtained from the pregroup on the disc for a discontinuity.

If the head position has reached the recording end address AWE without detecting any track jump, the system controller determines that the recording operation on that segment has terminated normally to terminate the operation (F316 to F331). That is, because this freely recordable area FRA has been made a recorded area REA, the system controller accordingly changes the associated data in the UTOC data to rewrite the UTOC area on the disc (F331) and terminates the disc writing operation (F332).

As described with reference to FIG. 1, since the magneto-optical disc for use on this embodiment allows data (for example, a program) to be dividedly recorded in two or more segments, the system controller 11 continues the recording operation by accessing the following freely recordable area FRA2 upon completion of the recording on the first FRA1 (for example, an access from cluster CL9 to cluster CL10). In this case, too, the system controller starts a write operation on a next recordable area FRA by first reading past data of a recorded area REA if the REA is adjacently located before the FRA. The system controller rewrites the UTOC data collectively upon completion of the recording on one segment or all of multiple segments (freely recordable areas). If the system controller 11 has detected an occurrence of a track jump during recording data to the freely recordable area FRA, it immediately suspends the recording operation to prevent data destruction (F317 to F318).

Since it is possible that a data destruction has been caused by a track jump before it is detected, the system controller tries to recover the destroyed data by means of re-recording. To be specific, the system controller first obtains absolute-position information provided after the track jump, sets it to the address ATJ provided immediately after the track jump (F319), and determines, based on the absolute-position information, whether the track jump has taken place toward the inner peripheral or the outer peripheral of the disc (F320). That is, the address ATJ is compared with the current writing address ACW.

Basic data may be destroyed by a track jump over less than three tracks (a track jump over three or more tracks instantaneously suspends a recording operation to prevent a data destruction from happening). A track jump toward the inner peripheral of the disc which may lead to a data destruction is classified into one of two types; a track jump that has reached a recorded area (cluster CL0) as indicated by scan H2 of FIG. 9 and a track jump that has taken place in a recordable area FRA as indicated by scan H6.

If ATJ<ACW and the track jump has taken place toward the inner peripheral, it is possible that the data destruction has started from a cluster containing a sector before a sector which provides the ATJ, so that an address of a start sector of the cluster is made the disc rewriting address ARW (F321). The system controller then compares the disc rewriting address ARW with the past data reading end address APE to determine whether the recording/reproducing head has reached the recorded area REA or not (F322). If the head is found having reached the recorded area REA as indicated by H2, the system controller reads the data of the destroyed cluster CL0 (that is, the cluster specified by the past data reading start address APS and the past data reading end address APE) from the buffer RAM 13 to rewrite the cluster.

The rewriting is performed in one of two methods. In one method, the rewriting starts at the APS, a location for starting past data reading as indicated by H3 of FIG. 9. In the other method, the rewriting starts at CL1 (AWS) as indicated by H5 of FIG. 9.

The rewriting according to the first method will be described by the flowchart of FIG. 13. The steps of the flow are represented by F401 through F433 respectively. Since the flowchart of FIG. 14 is almost the same as the flowchart of FIG. 13, descriptions of common steps are omitted. To perform the rewriting according to the first method, the system controller sets the disc writing address AW for rewriting to the past data reading start address APS (F423). Consequently, if a track jump indicated by H2 occurs, the rewriting starts from the past data reading start address APS as with H3, followed by the current data recording that starts at cluster CL1. If a track jump indicated by H6 occurs, the rewriting is performed starting at cluster CL3 as with H7 for example.

In the second method, as indicated by H5, the rewriting for data recovery of cluster CL0 starts at cluster CL1, which occupies a head position of the freely recordable area FRA. When the data of the destroyed cluster CL0 has been recovered in cluster CL1 as indicated by DP in FIG. 9, data DC to be currently recorded is recorded again starting at cluster CL2. Thus, if a track jump over less than three tracks occurs again during rewriting, the optical head will not reach cluster CL(−1) where data recovery is impossible. Execution of the second method will be described again by referring to the flowchart of FIG. 12.

The above-mentioned processing has been up to step F322 inclusive. The following will describe processing of F323 and on. When the system controller determines that a track jump has occurred toward the inner peripheral of the disc, destroying the recorded area, the controller sets the disc writing start address AWS to the disc writing address AW (F323). If the track jump has occurred within the freely recordable area FRA as indicated by H6, rewriting may be performed starting from a location at which the track jump has occurred, or the disc rewriting address ARW (cluster CL3) obtained in step F321, so that the system controller sets the disc rewriting address ARW to the disc writing address AW (F324).

Then, the system controller obtains a data range (an address range on the disc) currently stored in the buffer RAM 13 from the write pointer PW and the read pointer PR (F325) to check if data in the range for rewriting, or data between the disc writing address AW and an address immediately before the track jump (=the current writing address ACW) still remains in the buffer RAM 13 (F333). If the data is found missing, the rewriting is impossible, so that the system controller terminates the recording operation with a write error (F333). Usually, however, a rewriting operation is enabled because a track jump over three or more tracks suspends the recording operation instantaneously and at least the data of two tracks including the past data of the recorded area REA remain in the buffer RAM 13.

Subsequently, the system controller sets the read pointer PR in the buffer RAM 13 to a data location corresponding to the disc writing address AW from which to start rewriting (F329) and positions the recording/reproducing head to the disc writing address AW (F330) to restart writing the data starting from the disc writing address AW (F330 to F312 through F317).

Accordingly, if a track jump as indicated by H2 has occurred, writing of the past data DP restarts at the disc writing start address AWS (cluster CL1) and writing of the current data DC restarts at cluster CL2 as indicated by H5.

If a track jump as indicated by H6 has occurred, the writing restarts at cluster CL3 for example as indicated by H7.

The above-mentioned second method is advantageous over the first method as follows.

For example, if a track jump occurs again while a recording operation for data recovery is being performed in the first method as indicated by H4 of FIG. 9, the recording head may further reach cluster CL(−1) to destroy the past data recorded there. Since the past data of this cluster CL(1) has not been stored beforehand, recovery of the data is impossible. On the contrary, the second method does not involve such a problem because the recording start position has been offset.

If, in step F320, a track jump toward the outer peripheral of the disc is detected as indicated by H8 of FIG. 9 for example, it is possible that an error has occurred in data recording starting at an address detected last before the occurrence of the track jump, or a sector providing the current writing address ACW, the system controller obtains a cluster containing that sector and makes an address of a start sector of that cluster the disc rewriting address ARW (F327). Then, the system controller sets the disc rewriting address ARW to the disc writing address AW (F328) and proceeds to step F329 to restart the recording operation. Therefore, in this case, the writing restarts at cluster CL4 as indicated by H9 for example. Meanwhile, as indicated by H5, when the past data of cluster CL0 is moved to another area (cluster CL1) for example, the cluster CL0 becomes a recordable area. Cluster CL1 recorded with the past data of cluster CL0 becomes a recorded area containing data continued from cluster CL(−1). Consequently, after performing such a rewrite operation, required data is rewritten in the UTOC so that a link is provided between cluster CL(−1) and cluster CL1, and cluster CL0 is managed as a recordable area. That is, a parts table which indicates cluster CL0 as a recordable area is provided.

Thus, the above-mentioned processing described by referring to FIG. 10 ensures data recovery and continuation of a recording operation immediately after a data destruction caused by a track jump in a recordable area FRA or a track jump reaching a recorded area REA, preventing an eventual data destruction. Since data up to a predetermined track is recoverable, a track jump can surely be detected by checking a traverse signal and/or checking absolute-position information for discontinuity. A recording operation need not be suspended if a traverse signal has been generated by a foreign matter such as a dust on the disc for example. Thus, the recording efficiency is enhanced remarkably.

Additionally, if past data has been destroyed, an area recorded with the destroyed data is not rewritten; rather, the past data before destruction is written again to a freely recordable area FRA, preventing a destruction of data in an irrecoverable area if a track jump occurs again during the rewriting.

It should be noted that, in the above-mentioned first and second embodiments according to the invention, an amount of past data to be stored in the buffer RAM 13 is not restricted to one cluster. It may be set to other amounts depending on a storage size of the buffer RAM 13 or a track jump detection method used. In these embodiments, only data of a recorded area adjacently located before a freely recordable area FRA is stored beforehand. It is also possible, if an area adjacently located after an freely recordable area FRA is a recorded area REA, to previously store data of a start cluster for example of the area REA in order to prevent a data destruction caused by a track jump toward the outer peripheral of the disc.

It is apparent that, although the above-mentioned first and second embodiments are implemented by a recording/reproducing apparatus for example, they may be a recording-only apparatus. It is also apparent that the present invention may be embodied with any recording apparatus compatible with not only a magneto-optical disc but also a writable optical disc.

While the preferred embodiments of the invention have been described using specific terms, such description is for illustrative purpose only, and it is to be understood that changes and variations may be made without departing from the spirit or scope of the appended claims.

What is claimed is:

1. A recording apparatus for recording data onto a recording medium having at least one recordable area and at least one recorded area simultaneously, and a control table area, said recorded area and said recordable area including either one continuous segment respectively or a plurality of discrete segments respectively, said control table area managing a start address and an end address of said segment or each of said plurality of segments and link information for linking said plurality of segments if said recorded area and said recordable area include said plurality of segments, said recording apparatus comprising:

data reading means for reading the data from said recording medium;

storing means for storing said control table data read from said control table area by said data reading means;

recording start address calculating means for reading a start address indicating a start position of a recordable segment from said control table data stored in said storing means, and calculating a recording start address in accordance with said start address so as to provide a guard band between said start address and said recording start address for guarding the data of said recorded area; and control means for recording data onto said recording medium based on said recording start address.

2. A recording apparatus as defined in claim 1, further comprises:

recordable segment length calculating means for obtaining a recordable segment length from a start address and an end address of one segment in a recordable area, these start and end addresses read from said control table area; and comparing means for comparing said recordable segment length with said guard band length.

3. A recording apparatus as defined in claim 2, wherein said comparison between said recordable segment length and said guard band length set to a predetermined length is, if a recorded segment is disposed on a recordable segment at its front end and rear end respectively, to compare a length double said guard band length with said obtained recordable segment length.

4. A recording apparatus as defined in claim 2, wherein, if said recordable segment length is found smaller than said guard band length, a next recordable segment is reached by the link information in the control table to perform said predetermined arithmetic operation.

5. A recording apparatus for recording data onto a recording medium having at least one recordable area and at least one recorded area simultaneously, and a control table area, said recorded area and said recordable area including either one continuous segment respectively or a plurality of discrete segments respectively, said control table area managing a start address and an end address of said segment or each of said plurality of segments and link information for linking said plurality of segments if said recorded area and said recordable area include said plurality of segments, said recording apparatus comprising:

recording/reproducing means for recording data onto the recording medium and reproducing data from the recording medium;

storing means for storing recording data from an inputting means for a predetermined duration;

determining means for determining whether a segment adjacent to a segment of recordable area to be recorded is a recorded area; and control means for controlling said recording/reproducing means and said storing means such that if said determining means determines said adjacent segment is a recorded area, said recording/reproducing means reproduces recorded data of said adjacent segment, said storing means stores said reproduced recorded data, and said recording/reproducing means records said recording data from said input means stored in said storing means to the segment of said recordable area when said recording/reproducing means has reached the start address of the segment of said recordable area.

6. A recording apparatus as defined in claim 5, wherein said control means suspends a data recording operation if a track jump is detected during recording data onto a recordable area and, if data in said recorded area adjacent to the recordable area is destroyed by the track jump, reads from said storing means the data in said recorded area previously stored in said storing means to recover the data in said destroyed recorded area by using said data read from said storing means.

7. A recording apparatus as defined in claim 5, wherein, if said recorded area is located before said recordable area, data is read from said recorded area in a portion between a predetermined location near a trailing end of said recorded area and the trailing end to be stored in said storing means.

8. A recording apparatus as defined in claim 7, wherein, if data in said recorded area adjacent to a recordable area has been destroyed by a track jump, said control means reads the data of said recorded area previously stored in said storing means to record the data from the start address of said recordable area and subsequently record the entered recording data stored in said storing means.

9. A recording apparatus as defined in claim 8, wherein, if a recording operation for recovering the data in said destroyed recorded area has been executed, said control means registers in a control table the recorded area on the recording medium in which the data stored in said storing means was originally recorded as a recordable area.

10. A recording apparatus as defined in claim 5, wherein, if said recorded area is located after said recordable area, data is read from said recorded area in a portion between a beginning of said recorded area and a predetermined location away from the beginning to be stored in said storing means.

11. A recording apparatus as defined in claim 5, wherein, if said recorded area is located before and after said recordable area respectively, both the data between the predetermined location near the trailing end of said recorded area before said recordable area and the trailing end and the data between the beginning of the said recorded area after said recordable area and the predetermined location away from the beginning are read to be stored in said storing means.

12. A re-recording method for an apparatus for recording data onto a recording medium having at least one recordable area and least one recorded area simultaneously, and a control table area, said recorded area and said recordable area including either one continuous segment respectively or a plurality of discrete segments respectively, said control table area managing a start address and an end address of said segment or each of said plurality of segments and link information for linking said plurality of segments if said recorded area said recordable area include said plurality of segments, said method comprising the steps of:

searching the recording medium for a recordable area based on data of said control table area;

extracting a start address and an end address of a detected recordable area from the data of said control table area;

calculating at least one of a recording start address and a recording end address of the detected recordable area based on the extracted address data and a predetermined guard band length; and controlling a recording operation based on a result of said calculation.

13. A re-recording method as defined in claim 12, wherein the step of executing said predetermined arithmetic operation further comprises the steps of:

determining whether one of areas adjacent to said recordable area is a recorded area;

calculating, if one of the adjacent areas has been determined to be a recorded area, a segment length based on the start address and the end address of said detected recordable area to compare said predetermined guard band length with said segment length;

determining, if said segment length has been found greater than said guard band length, whether the area before said recordable area is a recorded area;

adding, if said area before said recordable area has been determined to be a recorded area, said start address to said guard band length to store a result of said addition as a recording start address; and controlling a recording start operation based on said recording start address.

14. A re-recording method as defined in claim 12, wherein said step of executing a predetermined arithmetic operation further comprises the steps of:

determining whether one of areas adjacent to said recordable area is a recorded area;

calculating, if one of the adjacent areas has been determined to be a recorded area, a segment length based on the start address and the end address of said detected recordable area to compare said predetermined guard band length with said segment length;

determining, if said segment length has been found greater than said guard band length, whether the area after said recordable area is a recorded area;

subtracting, if said area after said recordable area has been determined to be a recorded area, said guard band length from said end address to store a result of said subtraction as a recording end address; and controlling a recording suspending operation based on said recording end address.

15. A re-recording method according to claim 12, wherein said step of executing a predetermined arithmetic operation further comprises the steps of:

determining whether areas adjacent to said recordable area are recorded areas;

calculating, if both of the adjacent areas have been determined to be recorded areas, a segment length based on the start address and the end address of said detected recordable area to compare double said predetermined guard band length with said segment length;

adding, if said segment length has been found greater than double said guard band length, said start address to said guard band length to store a result of said addition as a recording start address and subtracting said guard band length from said end address to store a result of said subtraction as a recording end address; and controlling a recording operation based on said recording start address and said recording end address.

16. A re-recording method as defined in claim 12, wherein a method for controlling a track jump caused during a recording operation comprises the steps of:

determining whether a number of tracks jumped is greater than a predetermined number of tracks;

suspending the recording operation if the number of tracks jumped has been found greater than the predetermined number of tracks;

storing absolute-position information of a destination of the track jump;

determining whether the track jump has taken place toward an inner peripheral of the recording medium;

calculating, if the track jump has been found taking place toward the inner peripheral, a recording unit containing an absolute position immediately before said stored absolute-position information of the track jump destination;

determining whether data ranging from said calculated recording unit to a recording unit before the track jump remains in storing means; and executing, if said data has been found remaining in said storing means, a recording operation by using said calculated recording unit as a re-recording start address.

17. A re-recording method for an apparatus for recording data onto a recording medium having at least one recordable area and at least one recorded area simultaneously, and a control table area, said recorded area and said recordable area including either one continuous segment respectively or a plurality of discrete segments respectively, said control table area managing a start address and an end address of said segment or each of said plurality of segments and link information for linking said plurality of segments if said recorded area and said recordable area include said plurality of segments, said method comprising the steps of:

setting a writing start address and a writing end address of a recordable area on the recording medium based on said control table data which is recorded on said control table area;

determining whether an area before said writing start address is a recorded area;

subtracting writing start address has been determined a predetermined length from said writing start address and storing a result of said subtraction as a past data reading start address for reading data of a predetermined length from said recorded area only if the area before said writing start address has been determined to be a recorded area;

positioning an optical pickup to said past data reading start address;

setting a past data reading end address to said writing start address;

writing data into storing means based on said past data reading start address and said past data reading end address; and storing inputted data into said storing means and writing the inputted data from said storing means to the recordable area when said past data reading end address has been reached.

18. A re-recording method as defined in claim 17, further comprising the steps of:

detecting whether a track jump has taken place during a recording operation;

suspending, if the track jump has been detected, the recording operation;

storing an address immediately after the track jump;

determining whether the track jump has taken place toward an inner peripheral of the recording medium;

calculating, if the track jump has been found taking place toward the inner peripheral, a recording unit containing an address immediately before said stored address immediately after the track jump to store the calculated recording unit as a rewriting address;

comparing said rewriting address with said past data end address; and determining, if said rewriting address has been found smaller than said past data end address, that a data destruction has taken place to set said past data start address to a rewriting start address to record the past data stored in said storing means.

19. A re-recording method as defined in claim 17, still further comprising the steps of:

detecting whether a track jump has taken place during a recording operation;

suspending, if the track jump has been detected, the recording operation;

storing an address immediately after the track jump;

determining whether the track jump has taken place toward an inner peripheral of the recording medium;

calculating, if the track jump has been found taking place toward the inner peripheral, a recording unit containing an address immediately before said stored address immediately after the track jump to store the calculated recording unit as a rewriting address;

comparing said rewriting address with said past data end address; and determining, if said rewriting address has been found smaller than said past data end address, that a data destruction has taken place to set a rewriting start address to a writing start address of the recordable area to record the past data stored in said storing means.

20. A recording medium having at least one recordable area and at least one recorded area simultaneously, and a control table area, said recorded area and said recordable area including a plurality of discrete segments respectively, said control table area managing a start address and an end address of said segment or each of said plurality of segments and link information for linking said plurality of segments if said recorded area and said recordable area include said plurality of segments, said recording medium provided with a write-protected guard band of a predetermined length in said recordable area at a portion thereof adjacent to said recorded area.

21. A recording medium as defined in claim 20, wherein said write-protected guard band is provided in said recordable area at any one of an front end, an rear end, and both ends thereof respectively.

* * * * *